(12) United States Patent
Lu

(10) Patent No.: US 11,210,840 B1
(45) Date of Patent: Dec. 28, 2021

(54) TRANSFORM METHOD FOR RENDERING POST-ROTATION PANORAMIC IMAGES

(71) Applicant: ASPEED Technology Inc., Hsinchu (TW)

(72) Inventor: Chung-Yen Lu, Hsinchu (TW)

(73) Assignee: Aspeed Technology Inc., Hsinchu (TW)

( * ) Notice: Subject to any disclaimer, the term of this patent is extended or adjusted under 35 U.S.C. 154(b) by 0 days.

(21) Appl. No.: 17/005,013

(22) Filed: Aug. 27, 2020

(51) Int. Cl.
*G06T 15/04* (2011.01)
*G06T 17/20* (2006.01)
*G06T 3/60* (2006.01)
*H04N 5/232* (2006.01)

(52) U.S. Cl.
CPC ............ *G06T 15/04* (2013.01); *G06T 3/60* (2013.01); *G06T 17/20* (2013.01); *H04N 5/23238* (2013.01)

(58) Field of Classification Search
CPC .......... G06T 15/04; G06T 17/20; G06T 3/60; H04N 5/23238
See application file for complete search history.

(56) References Cited

U.S. PATENT DOCUMENTS

| | | | | |
|---|---|---|---|---|
| 6,009,190 A * | 12/1999 | Szeliski | .................. | G06K 9/209 345/427 |
| 6,031,540 A * | 2/2000 | Golin | ...................... | G06T 15/20 345/419 |
| 8,942,513 B2 | 1/2015 | Wu | | |
| 9,363,449 B1 * | 6/2016 | Jiang | ........................ | G06T 5/006 |
| 9,875,575 B2 * | 1/2018 | Satkin | .................. | H04N 13/239 |
| 10,186,067 B2 * | 1/2019 | Lu | ............................ | G06T 11/60 |
| 10,666,863 B2 * | 5/2020 | Wozniak | ............ | H04N 5/23238 |

(Continued)

FOREIGN PATENT DOCUMENTS

CN 104363438 A 2/2015

OTHER PUBLICATIONS

Richard Szeliski et al., Creating Full View Panoramic Image Mosaics and Environment Maps, Applications of Digital Image Processing XXXI, edited by Andrew G. Tescher, Proc. of SPIE vol. 7073, 70731J (2008), Microsoft (Year: 2008).*

(Continued)

*Primary Examiner* — Michael Le
(74) *Attorney, Agent, or Firm* — Muncy, Geissler, Olds & Lowe, P.C.

(57) ABSTRACT

A transform method applied in an image processing system is disclosed, comprising: when the image capture module is rotated, respectively performing inverse rotation operations over post-rotation space coordinates of three first vertices from a integral vertex stream according to rotation angles of the image capture module to obtain their pre-rotation space coordinates; calculating pre-rotation longitudes and latitudes of the three first vertices according to their pre-rotation space coordinates; selecting one from a pre-rotation panoramic image, a south polar image and a north polar image as a texture image to determine a texture ID for the three first vertices according to their pre-rotation latitudes; and, calculating pre-rotation texture coordinates according to the texture ID and the pre-rotation longitudes and latitudes to form a first complete data structure for each of the three first vertices.

23 Claims, 16 Drawing Sheets

(56) References Cited

U.S. PATENT DOCUMENTS

| | | |
|---|---|---|
| 2014/0024888 A1 | 1/2014 | Kim |
| 2014/0132708 A1* | 5/2014 | Kato .................. G06T 3/4038 348/36 |
| 2017/0302828 A1 | 10/2017 | Geerds |
| 2018/0018807 A1* | 1/2018 | Lu ..................... G06T 3/4038 |
| 2018/0322685 A1* | 11/2018 | Yi ..................... H04N 19/597 |

OTHER PUBLICATIONS

Heung-Yeung Shum et al., Construction and refinement of panoramic mosaics with global and local alignment, Applications of Digital Image Processing XXXI, edited by Andrew G. Tescher, Proc. of SPIE vol. 7073, 70731J (2008), Microsoft Research, (Year: 2008).*

Richard Szeliski et al., "Creating Full View Panoramic Image Mosaics and Environment Maps", Applications of Digital Image Processing XXXI, edited by Andrew G. Tescher, Proc. of SPIE vol. 7073, 70731J (2008), Microsoft Research, https://www.spiedigitallibrary.org/conference-proceedings-of-spie 8 pages.

Heung-Yeung Shum et al., "Construction and refinement of panoramic mosaics with global and local alignment", Applications of Digital Image Processing XXXI, edited by Andrew G. Tescher, Proc. of SPIE vol. 7073, 70731J (2008), Microsoft Research, https://www.spiedigitallibrary.org/conference-proceedings-of-spie pp. 953-958.

Michael Kazhdan et al., "Metric-Aware Processing of Spherical Imagery", Applications of Digital Image Processing XXXI, edited by Andrew G. Tescher, Proc. of SPIE vol. 7073, 70731J (2008), Johns Hopkins University and Microsoft Research, https://www.spiedigitallibrary.org/conference-proceedings-of-spie 10 pages.

* cited by examiner

Grid on equirectangle domain

FIG. 6C pseudo south polar vertex stream (arranged in sequence):

| V50 | V51 | V53 | V52 | ... | Vk |
|---|---|---|---|---|---|
| primitive_flag=0 | primitive_flag=0 | primitive_flag=1 | primitive_flag=1 | | primitive_flag=1 |
| (68, 0) | (68, 1) | (69, 0) | (68, 2) | | (i, j) |

FIG. 6D combined south polar vertex stream (arranged in sequence):

| V50 | V51 | V53 | V52 | ... | Vk |
|---|---|---|---|---|---|
| primitive_flag=0 | primitive_flag=0 | primitive_flag=1 | primitive_flag=1 | | primitive_flag=1 |
| $(u_{50}, v_{50})$ | $(u_{51}, v_{51})$ | $(u_{53}, v_{53})$ | $(u_{52}, v_{52})$ | | $(u_k, v_k)$ |
| $(\theta_{50}, \varphi_{50})$ | $(\theta_{51}, \varphi_{51})$ | $(\theta_{53}, \varphi_{53})$ | $(\theta_{52}, \varphi_{52})$ | | $(\theta_k, \varphi_k)$ |

TRANSFORM METHOD FOR RENDERING POST-ROTATION PANORAMIC IMAGES

BACKGROUND OF THE INVENTION

Field of the Invention

The invention relates to panoramic imaging, and more particularly, to a transform method for rendering post-rotation panoramic images.

Description of the Related Art

An equirectangular video is a commonly projection used in 360 video. A common example of equirectangular projection is a standard world map, which maps the surface of the world (a sphere) onto orthogonal coordinates. That is, equirectangular projection maps the latitude and longitude coordinates of a spherical globe directly onto horizontal and vertical coordinates of a grid. Image distortion is minimal at the equator, and infinite at the poles. The poles (Zenith, Nadir) are located at the top and bottom edge and are stretched to the entire width of the image.

FIG. 1A is a diagram showing a conventional panoramic image processing system. Referring to FIG. 1A, a conventional panoramic image processing system 10 includes an image capture module 11, an image processing apparatus 13, an image encoding module 12 and a correspondence generator 15. To capture a view with 360-degree horizontal FOV and 180-degree vertical field of view (FOV), the image capture module 11 includes a plurality of cameras/lenses. The cameras are properly placed so as to cover the system FOV up to 360 degree horizontally and 180 degree vertically. For example, as shown in FIG. 1B, the image capture module 11 includes six cameras/lenses (not shown) respectively mounted on the six faces of a cube framework 16 to simultaneously capture a view of the world with 360-degree horizontal FOV and 180-degree vertical FOV to generate six camera/lens images.

In the offline phase, six cameras of the image capture module 11 are calibrated separately. The correspondence generator 15 adopts appropriate image registration techniques to generate an original vertex list, and each vertex in the original vertex list provides the mapping between the equirectangular panoramic image and camera images (or between the equirectangular coordinates and the texture coordinates). For example, the sphere 18 with 2 meter radius (r=2) is drawn in many circles as latitude and longitude, whose intersection points are treated as calibration points (or vertices in the original vertex list). The six cameras capture these calibration points, and their positions on camera images are known. Then the mapping relationship between the equirectangular panoramic image and camera images (or between the equirectangular coordinates and the texture coordinates) are constructed since the view angles of the calibration points and camera image coordinates are linked. However, once the view angles of the calibration points are changed (e.g., the image capture module 11 is rotated/translated), a modified vertex list need to be produced in real-time for generating a correct equirectangular panoramic image.

U.S. Pat. No. 10,186,067 B2 (the disclosure of which is incorporated herein by reference in its entirety) discloses methods of generating panoramic images in response to a rotated and/or translated image capture module 11. According to the above disclosure, as soon as the image capture module 11 is rotated/translated, the equirectangular coordinates are modified, but the texture coordinates are fixed for each vertex in the modified vertex list in comparison with the original vertex list; in addition, each time a pole point (Zenith, Nadir) becomes inside a triangle formed by three post-rotation vertices, the triangle needs to be divided into two or three sub-triangles relative to the pole point, to ensure that the following rasterization in the image processing apparatus 13 is performed correctly. However, frequently dividing the triangle relative to the pole point is a nuisance task.

What is needed is a transform method of generating post-rotation panoramic images that deals with camera rotation, is easily implemented and provides best image quality.

SUMMARY OF THE INVENTION

In view of the above-mentioned problems, an object of the invention is to provide a transform method easy to implement and capable of reducing the negative effects caused by rotation of an image capture module during exposure.

One embodiment of the invention provides a transform method for rendering post-rotation panoramic images. The transform method is applied in an image processing system having an image capture module and a render engine. The image capture module captures a 360-degree horizontal field of view and 180-degree vertical field of view to generate a plurality of camera images. The method comprises: when the image capture module is rotated, respectively performing inverse rotation operations over post-rotation space coordinates of three first vertices from a integral vertex stream according to rotation angles of the image capture module to obtain their pre-rotation space coordinates; calculating pre-rotation longitudes and latitudes of the three first vertices according to their pre-rotation space coordinates; selecting one from a pre-rotation panoramic image, a south polar image and a north polar image as a texture image to determine a texture ID for the three first vertices according to their pre-rotation latitudes; and, calculating pre-rotation texture coordinates according to the texture ID and the pre-rotation longitudes and latitudes to form a first complete data structure for each of the three first vertices. The three first complete data structures of the three first vertices are inputted to the render engine and cause the render engine to render a triangle in a post-rotation panoramic image.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6C defines a pseudo south polar vertex stream with the texture coordinates specified by pseudo coordinates based on the triangle mesh in FIG. 6A.

FIG. 6D defines a combined south polar vertex stream with the texture coordinates specified by image coordinates together with longitude and latitude based on the triangle mesh in FIG. 6A.

DETAILED DESCRIPTION OF THE INVENTION

Figure 1A:
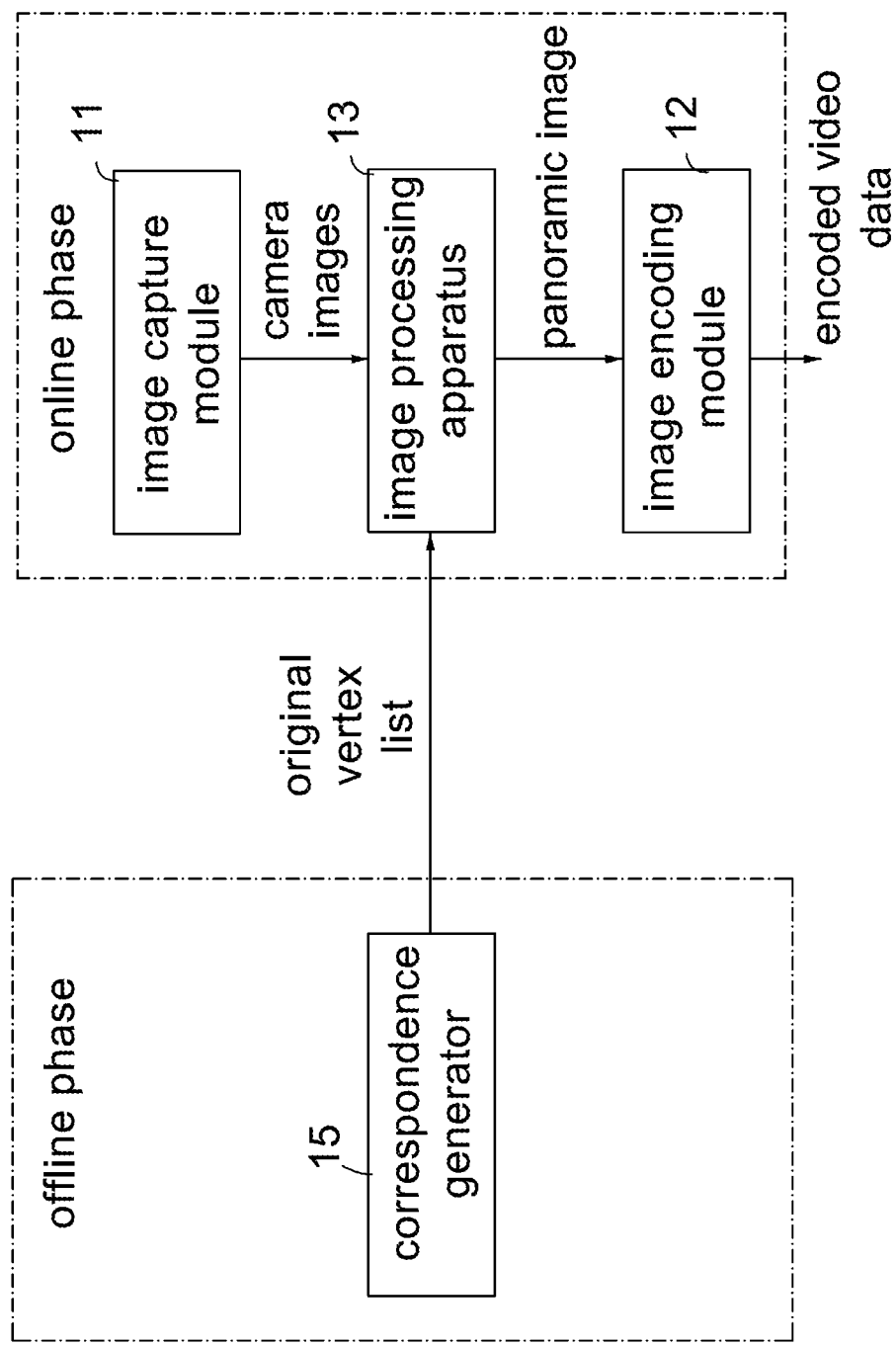
FIG. 1A is a diagram showing a conventional panoramic image processing system.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components and/or components with the same function are designated with the same reference numerals.

Through the specification and claims, the following notations/terms take the meanings explicitly associated herein, unless the context clearly dictates otherwise. The term "rasterization" refers to a process of computing the mapping from scene geometry (or a panoramic image) to texture coordinates. The term "texture coordinates (u, v)" refers to a 2D Cartesian coordinate system used in a source/texture image. The term "destination coordinates (x, y)" refers to a 2D Cartesian coordinate system used in a destination image. The term "space coordinates (X, Y, Z)" refers to a 3D Cartesian coordinate system used in a panoramic image. The term "image coordinates" refers to a 2D Cartesian coordinate system used in either an panoramic image or a south/north polar image (see FIGS. 5 and 6A-6D). The term "pseudo coordinates" refers to a pseudo coordinate system used in a triangle mesh modeling a panoramic image (see FIG. 4). The texture/image/destination coordinates also belong to a matrix coordinate system. The matrix coordinate space reflects a data matrix stored in the image. The data matrix is stored in rows of columns of pixel values. Therefore, pixel locations are the same as their corresponding row and column in the data matrix, where rows run from top to bottom and columns run from left to right. The origin of the matrix coordinate system is the top-left corner of an image and pixels are therefore identified by integer coordinates, row number first.

Figure 1B:
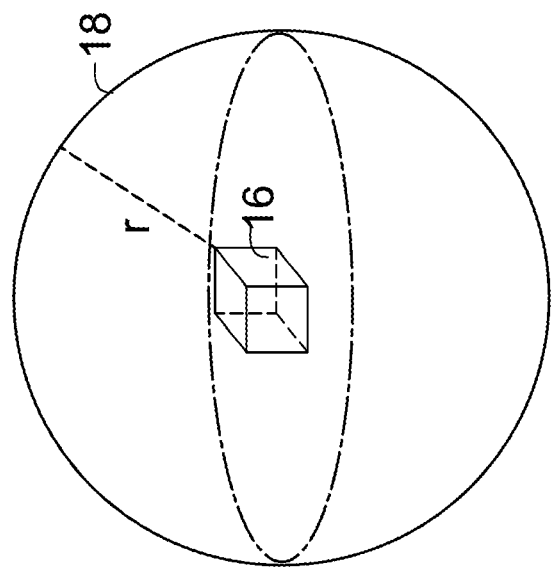
FIG. 1B shows a relation between a cube framework and a sphere.
Figure 2A:
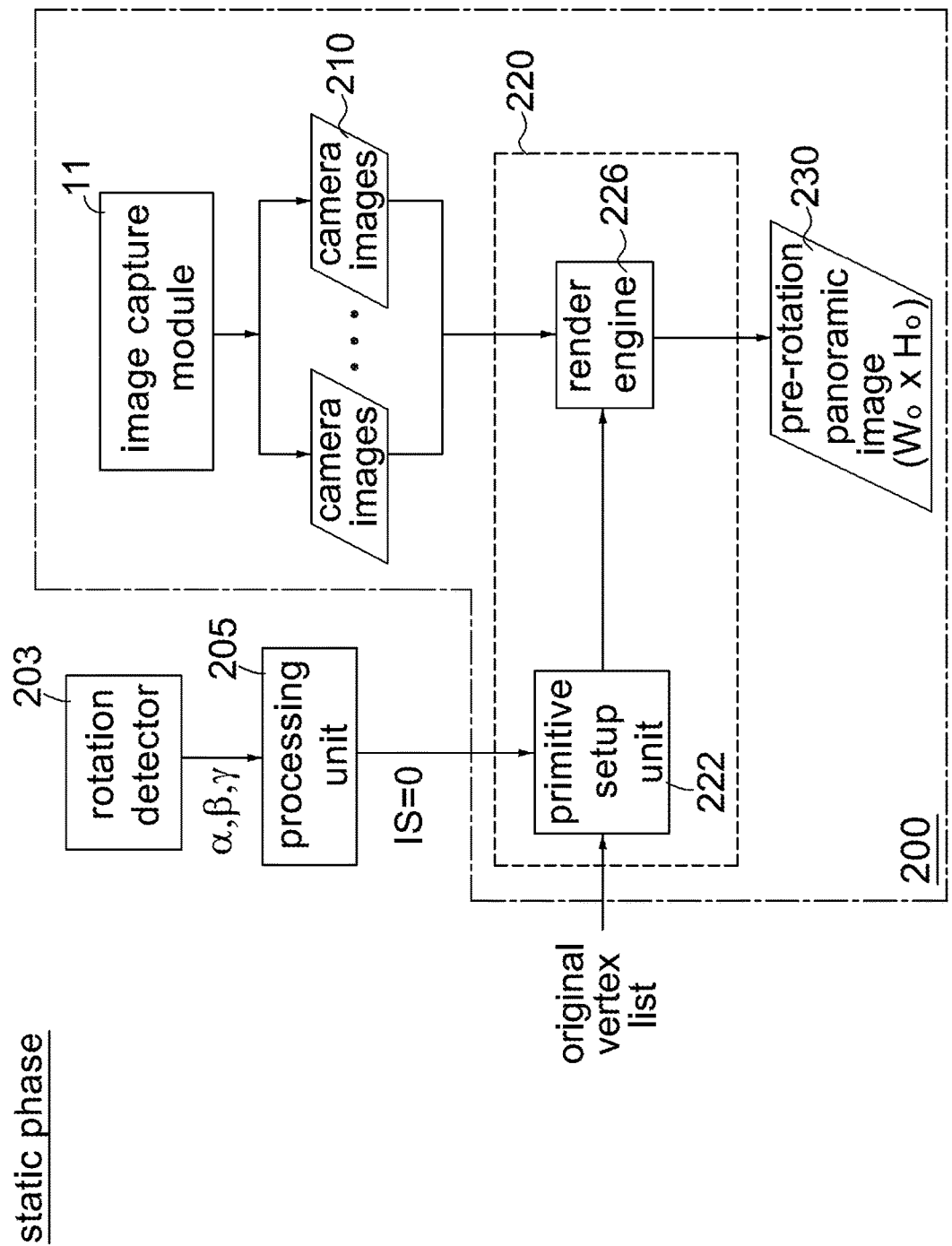
FIG. 2A is a diagram showing a panoramic image processing system in static phase according to the invention.

FIG. 2A is a diagram showing a panoramic image processing system in static phase according to the invention. Referring to FIG. 2A, a panoramic image processing system 200 of the invention includes an image capture module 11 and an image processing apparatus 220. The image processing apparatus 220 includes a primitive setup unit 222 and a render engine 226. The image capture module 11 is capable of capturing a view with 360 degree horizontal FOV and 180 degree vertical FOV to generate a plurality of camera/lens images. A rotation detector 203 detects the rotation angles $\alpha$, $\beta$, $\gamma$ about the x, y, z axes for the image capture module 11 and sends the rotation angles $\alpha$, $\beta$, $\gamma$ to a processing unit 205. The rotation detector 203 and the processing unit 205 are located outside the panoramic image processing system 200. If all the rotation angles $\alpha$, $\beta$, $\gamma$ are equal to zero, it indicates the image capture module 11 remains unmoved and the processing unit 205 issues a de-asserted indication signal IS (e.g., IS=0). Accordingly, the panoramic image processing system 200 stays in static phase in response to the de-asserted indication signal IS. After receiving the camera images from the image capture module 11, the image processing apparatus 220 in static phase performs rasterization, texture mapping and blending operations to form a pre-rotation panoramic image (or an original panoramic image) 230 by using any appropriate method. For example, the detailed operations that the image processing apparatus 13 in FIG. 1 forms the pre-rotation panoramic image (or the original panoramic image) using the camera images from the image capture module 11 and the original vertex list from the correspondence generator 15 are disclosed in U.S. application Ser. No. 15/211,732 (the disclosure of which is incorporated herein by reference in its entirety), and thus the descriptions are omitted herein.

Figure 2B:
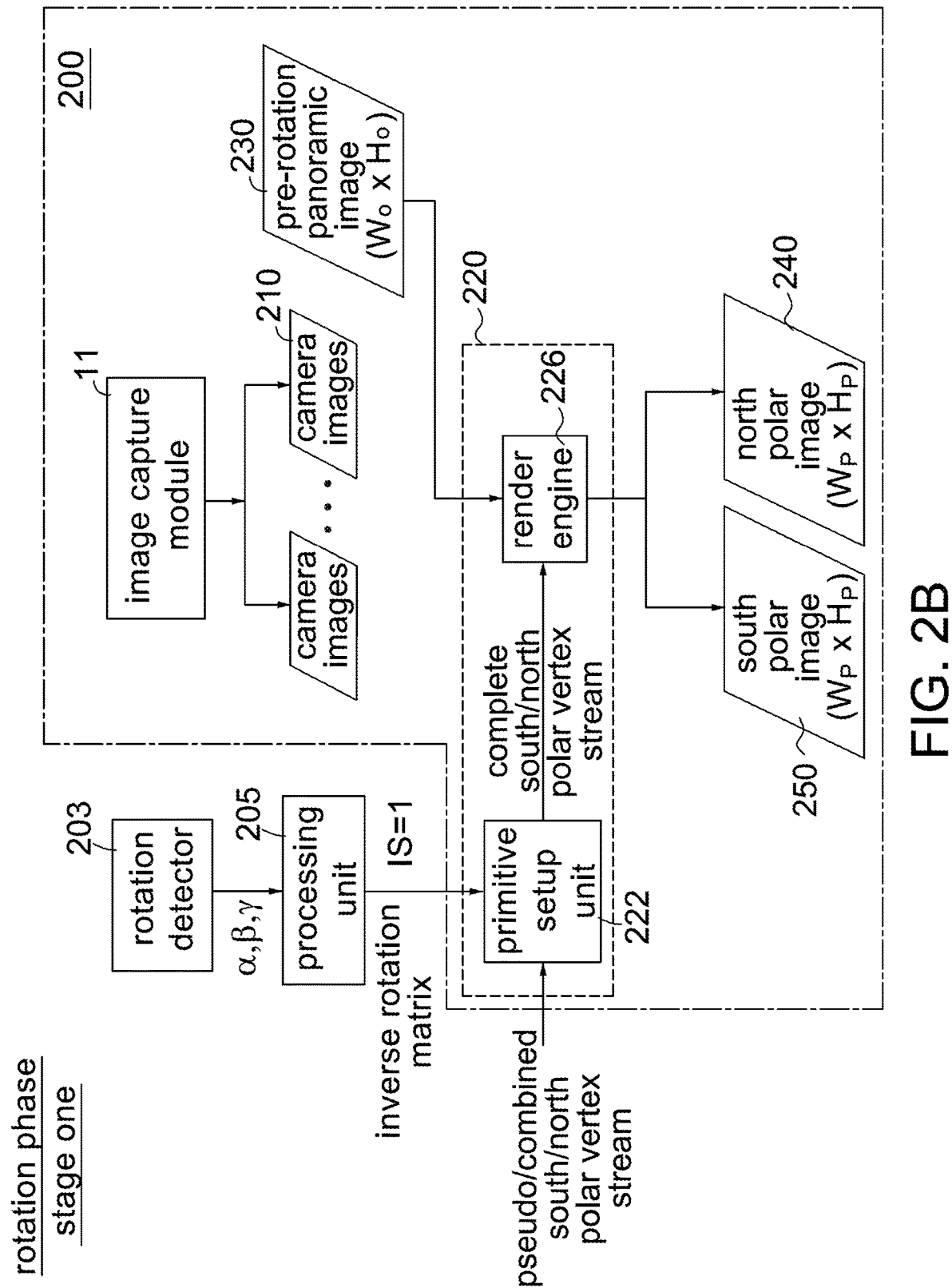
FIGS. 2B-2C show data-flow diagrams of the panoramic image processing system at stage one and stage two of rotation phase according to an embodiment of the invention.
Figure 2C:
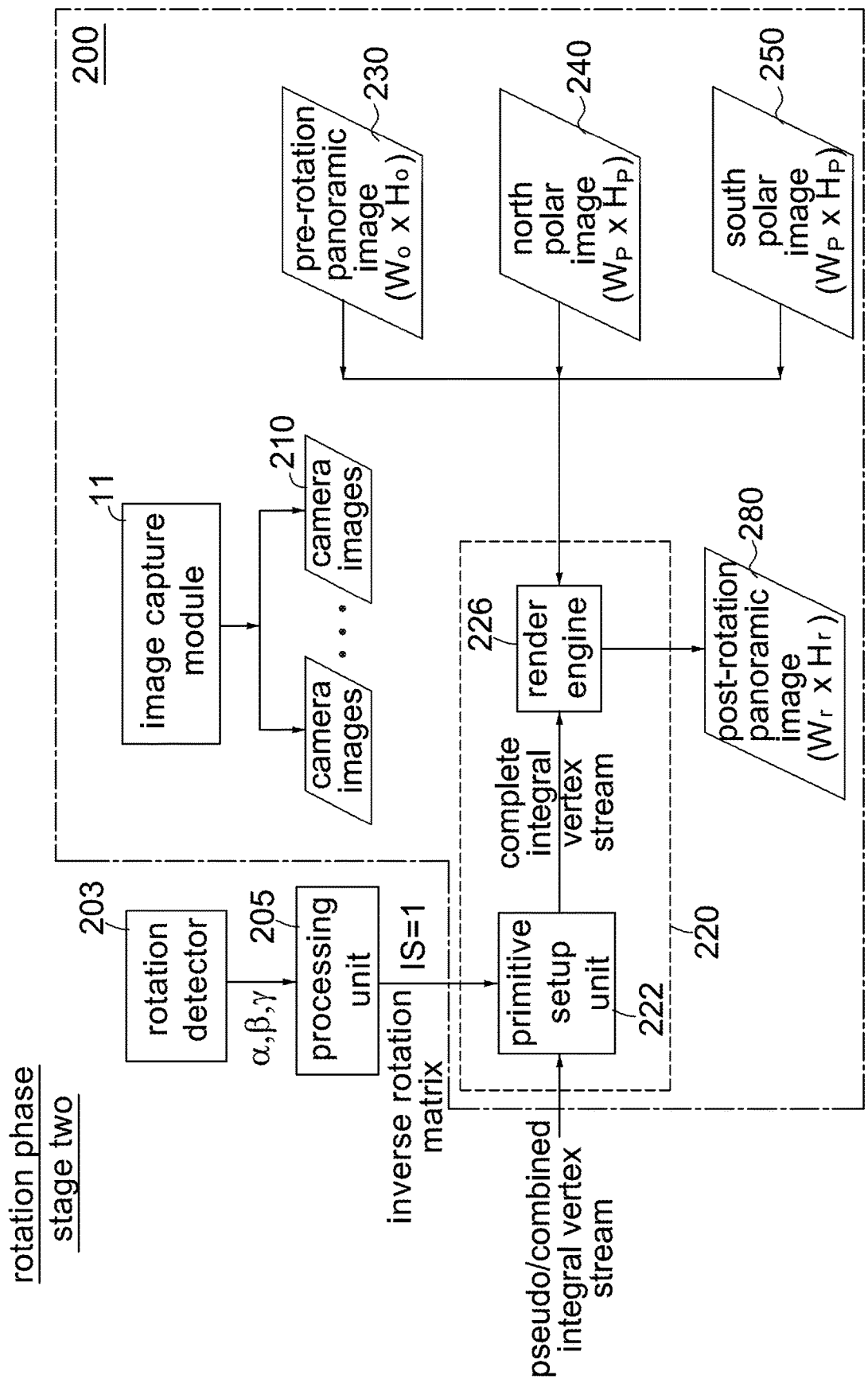

FIGS. 2B-2C show data-flow diagrams of the panoramic image processing system in rotation phase according to an embodiment of the invention. Referring to FIG. 2B, if at least one of the rotation angles $\alpha$, $\beta$, $\gamma$ is not equal to zero, it indicates the image capture module 11 is being rotated and the processing unit 205 needs to issue an asserted indication signal IS (e.g., IS=1) indicating a rotation event and generate an inverse rotation matrix $R_{3D}^{-1}$. A basic rotation is a rotation about at least one of the axes of the spherical coordinate system. The following three basic rotation matrices for the image capture module 11 rotate vectors by rotation angles $\alpha$, $\beta$, $\gamma$ about the x, y, z axes, respectively, using the right-hand rule—which codifies their alternating signs.

$$Rx(\alpha) = \begin{bmatrix} 1 & 0 & 0 \\ 0 & \cos\alpha & \sin\alpha \\ 0 & -\sin\alpha & \cos\alpha \end{bmatrix};$$

$$Ry(\beta) = \begin{bmatrix} \cos\beta & 0 & -\sin\beta \\ 0 & 1 & 0 \\ \sin\beta & 0 & \cos\beta \end{bmatrix};$$

$$Rz(\gamma) = \begin{bmatrix} \cos\gamma & \sin\gamma & 0 \\ -\sin\gamma & \cos\gamma & 0 \\ 0 & 0 & 1 \end{bmatrix};$$

$$\begin{bmatrix} x' \\ y' \\ z' \end{bmatrix} = RxRyRz \begin{bmatrix} x \\ y \\ Z \end{bmatrix} = R_{3D} \begin{bmatrix} x \\ y \\ x \end{bmatrix}$$

(1)

Thus, the 3D rotation matrix $R_{3D}$ derived from three basic rotation matrices is given by: $R_{3D}$=Rx Ry Rz. According to the rotation angles α, β, γ, the processing unit 205 generates a rotation matrix $R_{3D}$ and an inverse rotation matrix $R_{3D}^{-1}$ by using equation (1). Referring to FIG. 2B, upon receiving an asserted indication signal IS (e.g., IS=1), the image processing apparatus 220 enters a rotation phase with two stages. At stage one of the rotation phase, the image processing apparatus 220 renders a north polar image 240 according to a pseudo/combined north polar vertex stream and the pre-rotation panoramic image 230, and also renders a south polar image 250 according to a pseudo/combined south polar vertex stream and the pre-rotation panoramic image 230 (will be detailed in FIGS. 5 and 6A-6D). Referring to FIG. 2C, at stage two of the rotation phase, the image processing apparatus 220 generates a post-rotation panoramic image 280 according to a pseudo/combined integral vertex stream, the pre-rotation panoramic image 230, the south and the north polar images 240, 250 and the inverse rotation matrix $R_{3D}^{-1}$ (will be detailed in FIGS. 7A-7B). Specifically, at stage two of the rotation phase, the primitive setup unit 222 transforms one of a pseudo integral vertex stream in FIG. 3B and a combined integral vertex stream in FIG. 3C into a complete integral vertex stream in FIG. 3D and then transmits the complete integral vertex stream to the render engine 226. The render engine 226 performs triangle rasterization and texture mapping operations according to the complete integral vertex stream, the pre-rotation panoramic image 230 and the south and the north polar images 240 and 250 to form a post-rotation panoramic image 280 (will be detailed below).

Examples of the panoramic image include, without limitation, a 360-degree panoramic image and an equirectangular panoramic image. For purposes of clarity and ease of description, hereinafter, the following examples and embodiments will be described with the equirectangular panoramic image.

Figure 3A:
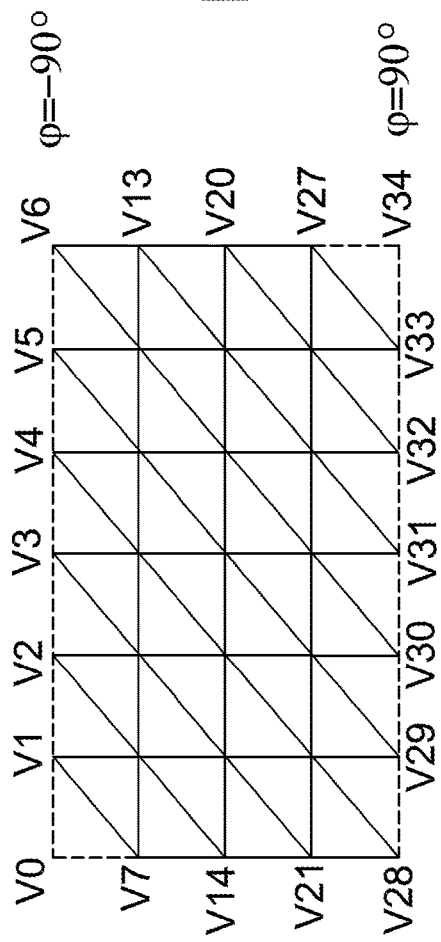
FIG. 3A is a diagram showing an example triangle mesh modeling an equirectangular panoramic image.

FIG. 3A is a diagram showing an example triangle mesh modeling an equirectangular panoramic image. Referring to FIG. 3A, the example triangle mesh is divided into four rows and six columns of quadrilaterals and each quadrilateral is further divided into two triangles. The vertices of the triangle mesh are respectively assigned reference numbers (or vertex IDs) in order, from left to right and from top to bottom. The vertices V0~V6 refer to a north pole (Zenith) and the vertices V28~V34 refer to a south pole (Nadir). Hereinafter, the vertices V0~V6 and V28~V34 are called "pole vertices". According to the invention, an integral vertex stream is a list of multiple vertices forming a plurality of triangles of the triangle mesh on an equirectangular panoramic image and no triangle contains two or more pole vertices. As the example in FIG. 3A, each of the top-left triangle and bottom-right triangle contains two pole vertices and thus the vertices (V0, V34) are excluded to prevent from forming the top-left triangle and bottom-right triangle. Thus, an integral vertex stream for the triangle mesh in FIG. 3A is a list of thirty-three vertices (V1~V33) forming a plurality of triangles. The vertices in the integral vertex stream for the triangle mesh in FIG. 3A are arranged in the following sequence: V7(0),V1(0),V8(1),V2(0),V9(1),V3(0), V10(1), V4(0),V11(1),V5(0),V12(1),V6(0),V13(1),V7(0),V14(0), V8(1), V15(1),V9(1),V16(1),V10(1), V17(1),V11(1),V18 (1),V12(1),V19(1), V13(1), V20(1),V14(0),V21(0),V15(1), V22(1),V16(1),V23(1),V17(1),V24(1),V18(1), V25(1),V19 (1),V26(1),V20(1),V27(1),V21(0),V28(0),V22(1),V29(0), V23(1), V30(0),V24(1),V31(0),V25(1), V32(0),V26(1), V33(0),V27(1). In the above sequence, the number inside each parentheses denotes a primitive flag indicating whether a triangle is assembled/formed by its own vertex and its immediately-previous two vertices. As the example in FIG. 3A, if a triangle is assembled/formed by a vertex and its immediately-previous two vertices, its primitive flag is set to 1, otherwise its primitive flag is set to 0. For example, since a vertex V8 is allowed to form a triangle along with its immediately-previous two vertices (V7, V1), its primitive flag for vertex V8 is set to 1; contrarily, since a vertex V33 is not allowed to form a triangle along with its immediately-previous two vertices (V32, V26), its primitive flag for vertex V33 is set to 0.

Figure 3B:
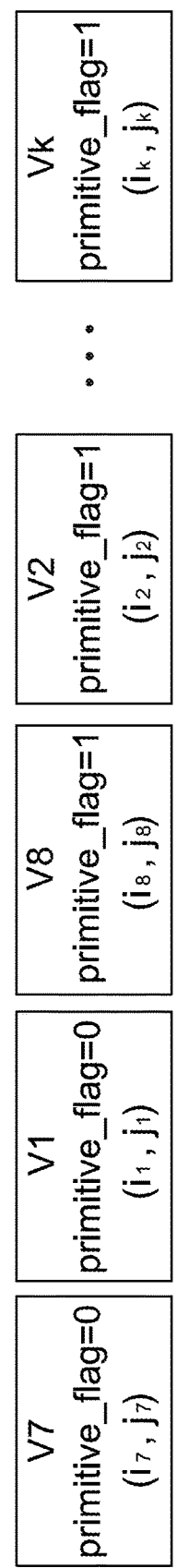
FIG. 3B defines a pseudo integral vertex stream with the post-rotation destination coordinates specified by pseudo coordinates based on the triangle mesh in FIGS. 3A and 4.
Figure 3C:
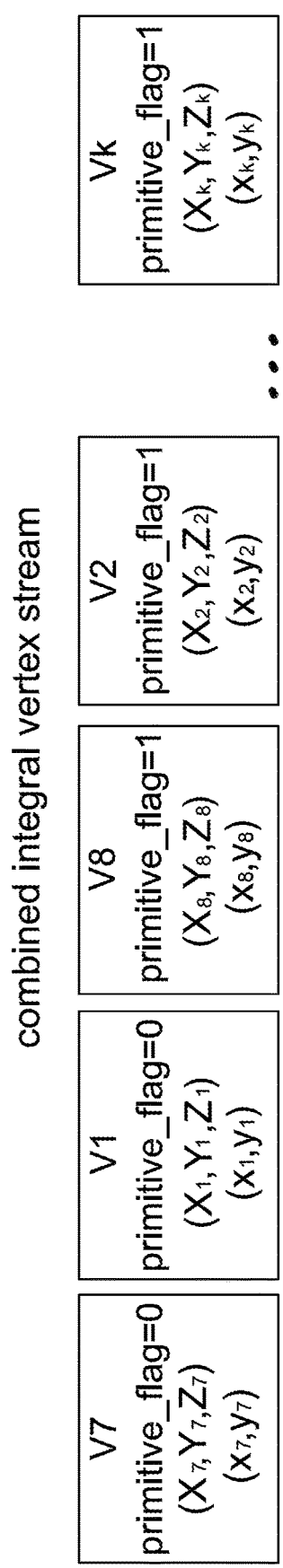
FIG. 3C defines a combined integral vertex stream with the post-rotation destination coordinates specified by post-rotation image coordinates together with post-rotation space coordinates based on the triangle mesh in FIG. 3A.

As set forth above, the integral vertex stream is a list of multiple vertices forming a plurality of triangles of the triangle mesh on an equirectangular panoramic image. Besides, each vertex in the integral vertex stream is defined by its corresponding data structure. There are three types for the integral vertex stream as follows: (1) pseudo integral vertex stream (e.g., FIG. 3B), (2) combined integral vertex stream (e.g., FIG. 3C), (3) complete integral vertex stream (e.g., FIG. 3D). In particular, each vertex in each of the pseudo and the combined integral vertex streams is defined by a partial data structure while each vertex in each of the complete integral vertex streams is defined by a complete data structure. For example, the partial data structure for each vertex in the pseudo/combined integral vertex stream includes, without limitation, a vertex ID, a primitive flag, and post-rotation destination coordinates. For each integral vertex stream, the post-rotation equirectangular panoramic image is always treated as destination space. The post-rotation destination coordinates in the partial data structure of each vertex in the pseudo integral vertex stream are specified by pseudo coordinates as shown in FIGS. 3B and 4, while the post-rotation destination coordinates in the partial data structure of each vertex in the combined integral vertex stream are specified by post-rotation space coordinates together with post-rotation image coordinates as shown in FIG. 3C. FIG. 3B defines a pseudo integral vertex stream with the post-rotation destination coordinates specified by pseudo coordinates based on the triangle mesh in FIGS. 3A and 4. FIG. 3C defines a combined integral vertex stream with the post-rotation destination coordinates specified by post-rotation space coordinates and post-rotation image coordinates based on the triangle mesh in FIG. 3A.

Figure 3D:
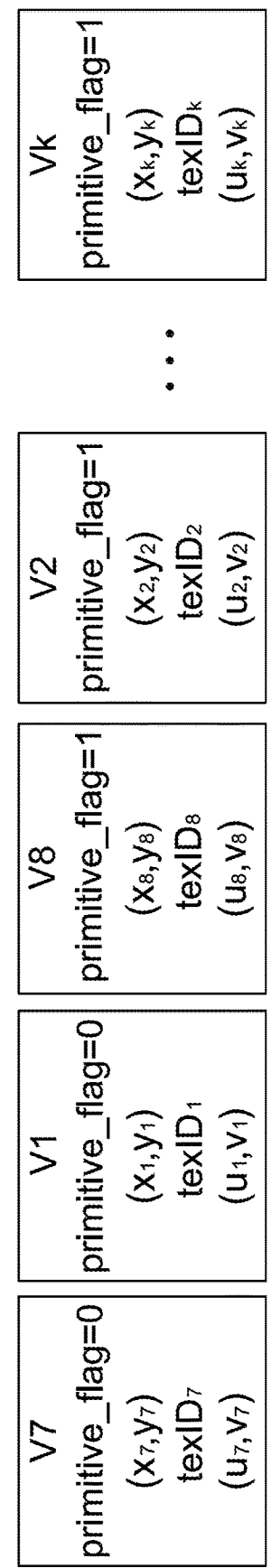
FIG. 3D defines a complete integral vertex stream with reference to FIGS. 3B-3C.
Figure 4:
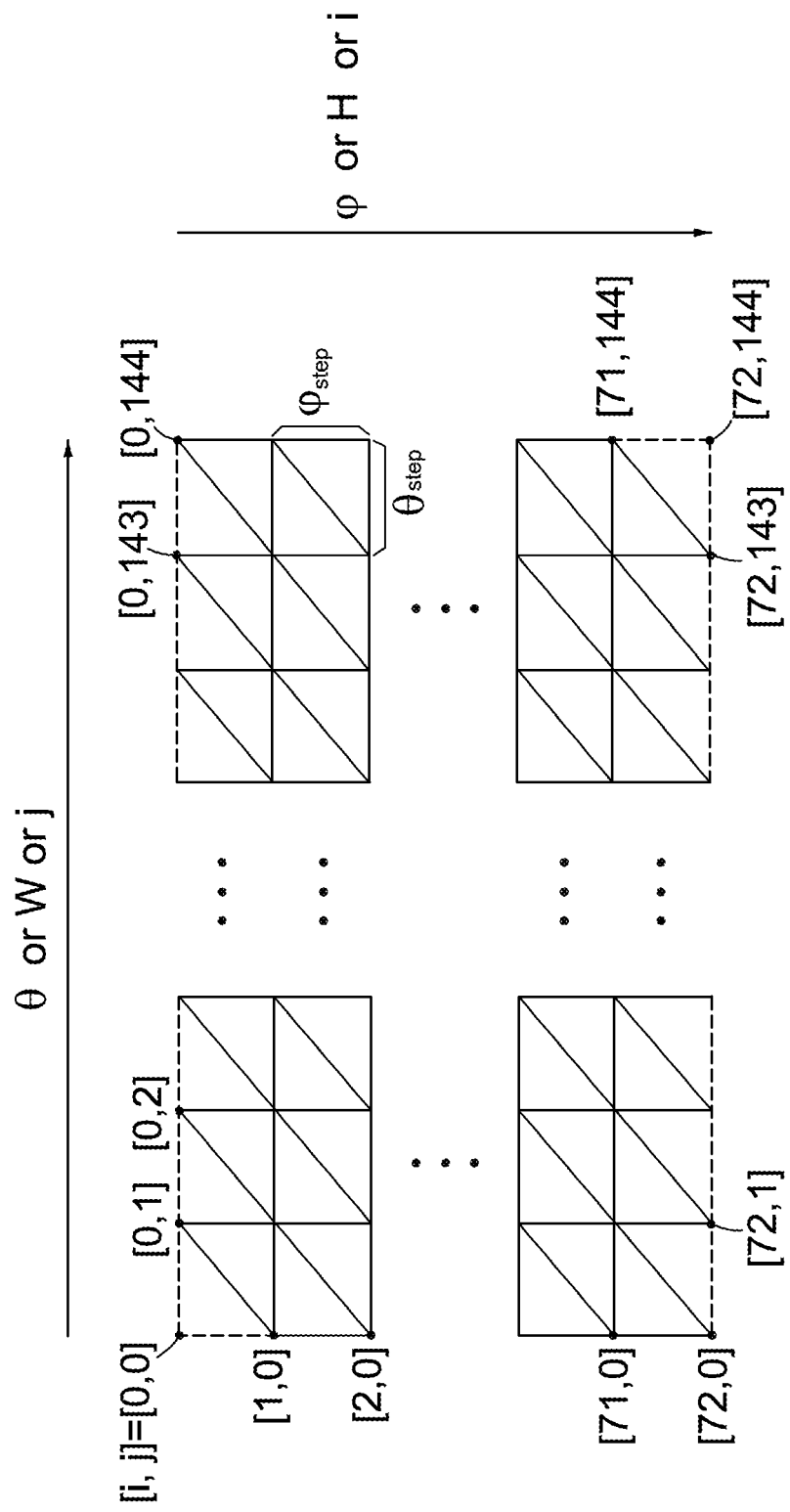
FIG. 4 is a diagram showing an example grid modeling an equirectangular panoramic image.

FIG. 3D defines a complete integral vertex stream with reference to FIGS. 3A-3C. As set forth above, each vertex in the complete integral vertex stream is defined by a complete data structure. Besides, each complete data structure for each vertex in the complete integral vertex stream defines a vertex mapping between a destination space and a texture space. In the example of FIG. 3D, each complete data structure for each vertex in the complete integral vertex stream includes, without limitation, a vertex ID, a primitive flag, post-rotation destination coordinates (x, y), texture ID (texID) and pre-rotation texture coordinates (u, v). Here, the post-rotation destination coordinates are specified by post-rotation image coordinates and texture ID indicates which one of the following three images is selected as texture space: the pre-rotation equirectangular panoramic image, the north polar image and the south polar images. For example, the pre-rotation equirectangular panoramic image is selected as texture space if texID is set to 0; the north polar image is selected as texture space if texID is set to 1; the south polar image is selected as texture space if texID is set to 2. The pre-rotation texture coordinates are image coordinates in the texture space specified by texture ID (texID), i.e., one of the pre-rotation equirectangular panoramic image, the north polar image and the south polar images.

FIG. 4 is a diagram showing an example grid modeling an equirectangular panoramic image. Referring to FIG. 4, the grid (or a pseudo coordinate system) can be visualized as a rectangular structure with rows and columns of squares on an equirectangular panoramic image. The example grid in FIG. 4 correspond to the triangle mesh in FIG. 3A and thus the vertices/intersection of the grid in FIG. 4 correspond to the vertices of the triangle mesh in FIG. 3A. The example grid (or the pseudo coordinate system or the triangle mesh) in FIG. 4 is applicable to the pre-rotation equirectangular panoramic image 230 and the post-rotation equirectangular panoramic image 280. The topmost and leftmost point in FIG. 4 is defined as the origin (0,0) of the pseudo coordinate system. Each intersection/vertex of the grid in FIG. 4 is specified by a pair of numerical coordinates, which are the distances to the origin, measured in units of horizontal spacing between vertices for horizontal axis and in units of vertical spacing between vertices for vertical axis. In other words, the horizontal spacing between any two neighboring vertices in horizontal axis is equal and the vertical spacing between any two neighboring vertices in vertical axis is equal in the pseudo coordinate system. Depending on different coordinate systems, the horizontal and vertical axes vary. For example, horizontal and vertical axes refer to $\theta$ and $\varphi$ for longitude and latitude; horizontal and vertical axes refer to j and i for pseudo coordinates of the pseudo coordinate system; horizontal and vertical axes refer to W and H (i.e., resolution) for image coordinates.

If the grid in FIG. 4 models a post-rotation equirectangular panoramic image 280, Wr and Hr respectively denote the width and the height of the post-rotation equirectangular panoramic image 280 on a resolution scale. If the grid in FIG. 4 models a pre-rotation equirectangular panoramic image 230, Wo and Ho respectively denote the width and the height of the pre-rotation equirectangular panoramic image 230 on a resolution scale. $\theta_{start}$ and $\varphi_{start}$ respectively denote the longitude and latitude of the topmost and leftmost point/origin of the grid on a longitude/latitude scale in FIG. 4; $\theta_{step}$ and $\varphi_{step}$ respectively denote the width and the height of each square of the grid on a longitude/latitude scale in FIG. 4. Nx denotes the total number of squares along the horizontal axis and Ny denotes the total number of squares along the vertical axis for the pseudo coordinate system in FIG. 4. $W_P$ denotes both the width and the height of the north and the south polar images 240 and 250 (will be described below). $\varphi_{north}$ denotes the latitude of the north pole (Zenith) and $\varphi_{south}$ denotes the latitude of the south pole (Nadir). For purposes of clarity and ease of description, hereinafter, the following examples and embodiments will be described with the following assumption of settings: (Wo, Ho)=(Wr, Hr)=(4096, 2048); $(\theta_{start}, \varphi_{start})$=(−180°,−90°; $(\theta_{step}$ and $\varphi_{step})$=(2.5°,2.5°); $W_P$=256; $\varphi_{north}$=−90°; $\varphi_{south}$=90°. Thus, Nx=360°/2.5°=144 and Ny=180°/2.5°=72.

Figure 5:
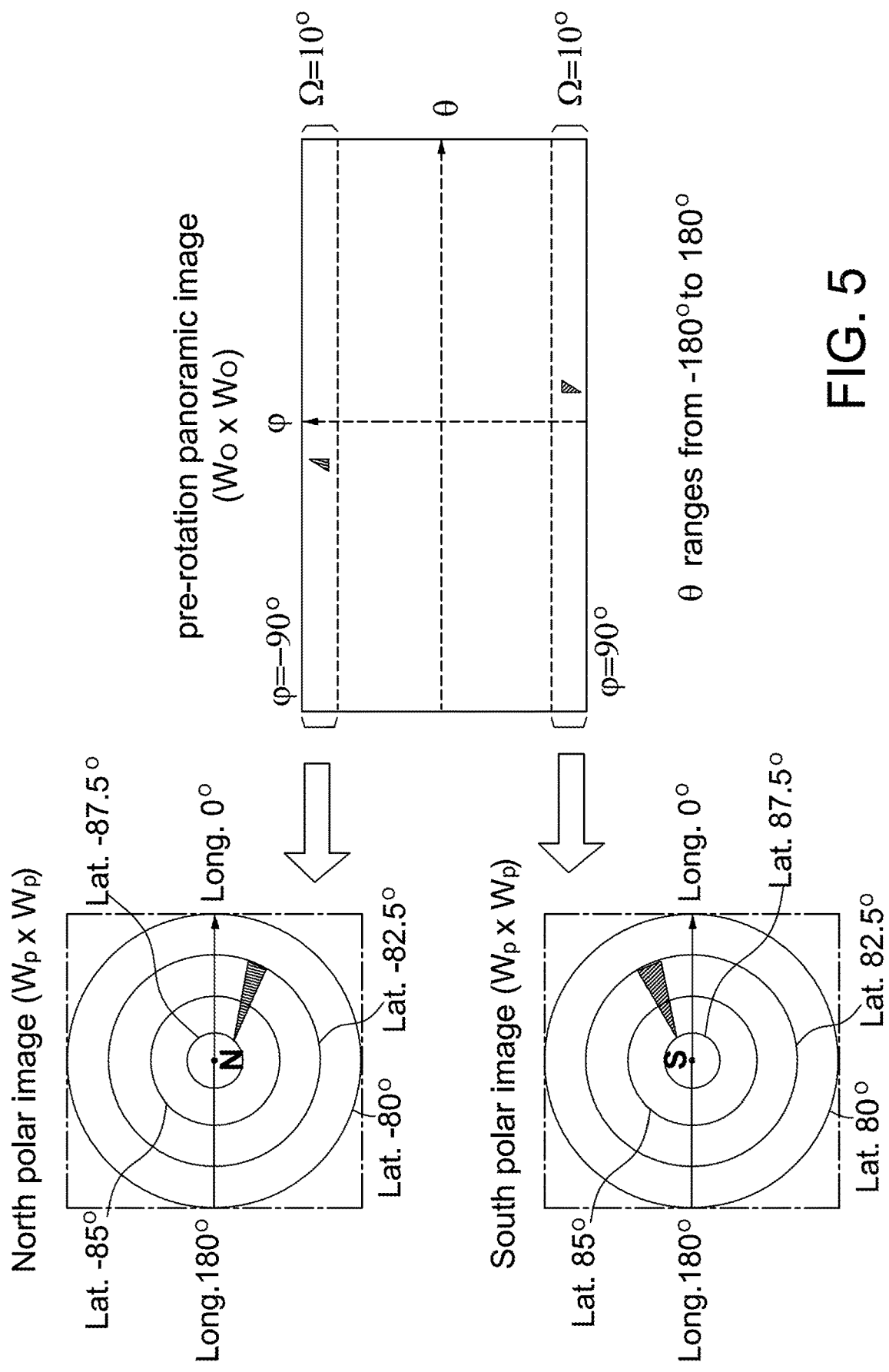
FIG. 5 is an example diagram showing a north polar image and a south polar image are generated according to the pre-rotation equirectangular panoramic image.

FIG. 5 is an example diagram showing a north polar image and a south polar image are generated by the image processing apparatus 220 at stage one of rotation phase according to the pre-rotation equirectangular panoramic image. Please note that each of the north and the south polar images 240 and 250 is a square image with a width of $W_P$. In the example of FIG. 5, with the assumption of $\Omega$=10°, the north and the south polar images 240 and 250 are generated from the pre-rotation equirectangular panoramic image 230 according to north and south polar vertex streams. Referring to FIG. 5, with the assumption of $\Omega$=10° and $(\theta_{step}, \varphi_{step})$=(2.5°, 2.5°), the vertices associated with four(=10°/2.5° rows of the topmost squares in FIG. 4 form the north polar vertex stream and the vertices associated with four rows of the bottommost squares in FIG. 4 form the south polar vertex stream, in comparison with the vertices associated with all rows of squares in FIG. 4 forming the integral vertex stream.

Figure 6A:
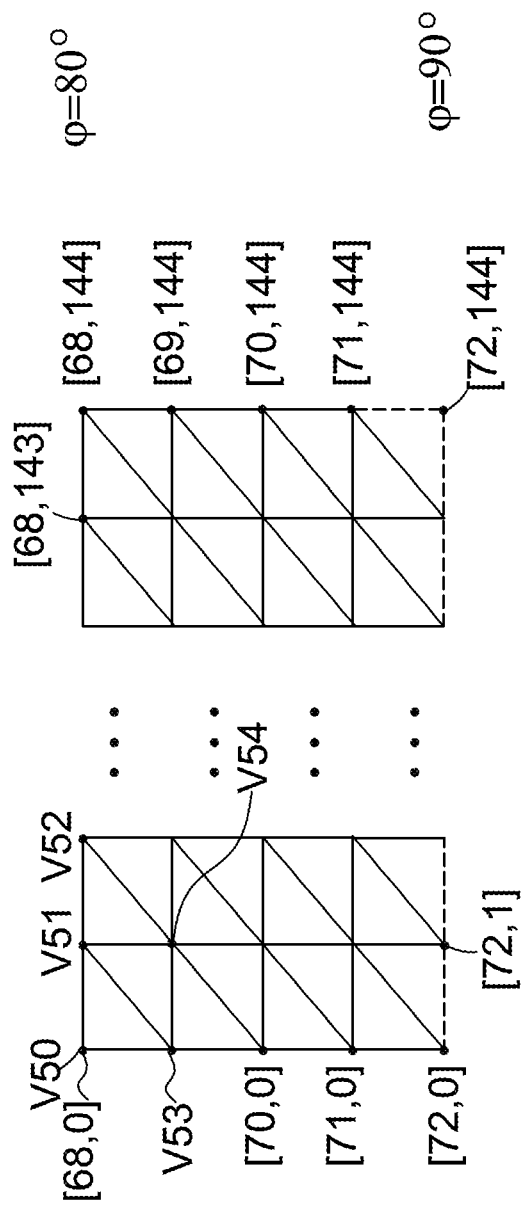
FIG. 6A is an example diagram showing the vertices associated with four rows of the bottommost squares in FIG. 4 with the assumption of $\Omega=10°$ and $(\theta_{step}$ and $\varphi_{step})=(2.5°, 2.5°)$.

FIG. 6A is an example diagram showing the vertices associated with four rows of the bottommost squares in FIG. 4 with the assumption of $\Omega$=10° and $(\theta_{step}$ and $\varphi_{step})$=(2.5°, 2.5°). The types of the south polar vertex streams in FIGS. 6C-6E are similar to those of the above integral vertex streams in FIGS. 3B-3D. There are also three types for the north and south polar vertex streams as follows: (1) pseudo north/south polar vertex stream (e.g., FIG. 6C), (2) combined north/south polar vertex stream (e.g., FIG. 6D), (3) complete north/south polar vertex stream (e.g., FIG. 6E). Analogous to the integral vertex stream, each vertex in each of the pseudo and the combined north/south polar vertex streams is defined by a partial data structure while each vertex in each of the complete north/south polar vertex streams is defined by a complete data structure. In particular, the partial data structure for each vertex in the pseudo/combined north/south polar vertex stream includes, without limitation, a vertex ID, a primitive flag and texture coordinates. For rendering the north and south polar images 240 and 250, the pre-rotation equirectangular panoramic image 230 is always treated as the texture space. The texture coordinates in the partial data structure of each vertex in the pseudo north/south polar vertex stream are specified by pseudo coordinates (e.g., FIG. 6C) in the pre-rotation equirectangular panoramic image 230, while the texture coordinates in the partial data structure of each vertex in the combined north/south polar vertex stream are specified by image coordinates together with the longitude and latitude (e.g., FIG. 6D) in the pre-rotation equirectangular panoramic image 230. In the example of FIG. 6E, each complete data structure for each vertex in the complete south polar vertex stream includes, without limitation, a vertex ID, a primitive flag, destination coordinates (x, y) (in the north/south polar image 240 and 250), texture ID (texID) and texture coordinates (u, v) (in the pre-rotation equirectangular panoramic image 230).

Figure 6B:
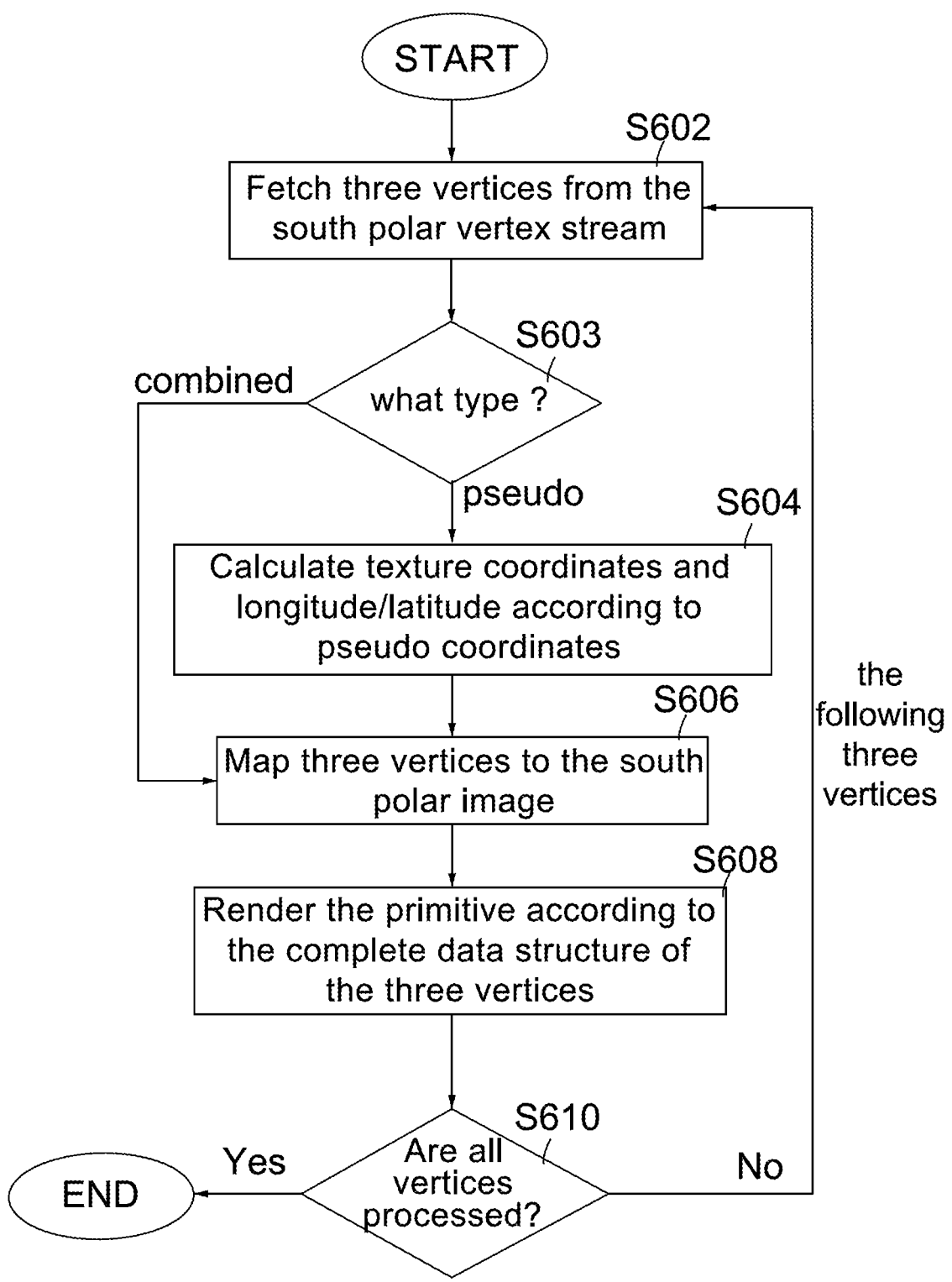
FIG. 6B is a flow chart showing a method of rendering a south polar image applied in the image processing apparatus 220 at stage 1 of rotation phase according to one embodiment of the invention.
Figure 6E:
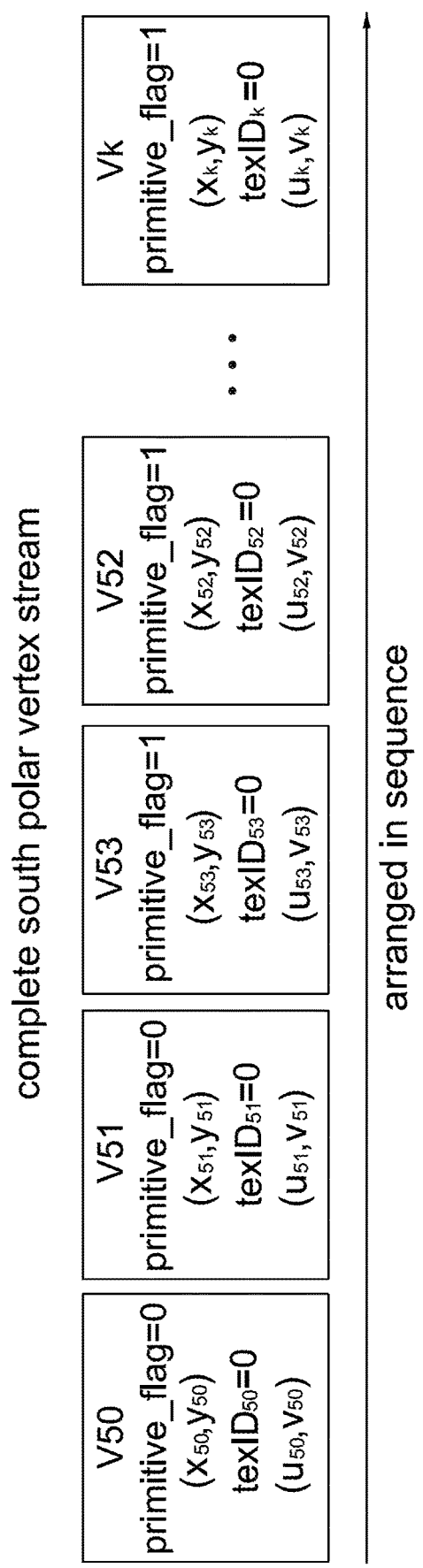
FIG. 6E defines a complete south polar vertex stream with reference to FIGS. 6C-6D.

FIG. 6B is a flow chart showing a method of rendering a south polar image applied in the image processing apparatus 220 at stage one of rotation phase according to one embodiment of the invention. Hereinafter, the method of rendering a south polar image 250 is described in conjunction with the pseudo/combined south polar vertex stream with reference to FIGS. 2B, 4 and 6A-6E and with the assumption that the image processing apparatus 220 in static phase already forms a pre-rotation equirectangular panoramic image 230 based on the camera images 210 from the image capture module 11.

Step S602: Sequentially fetch three vertices from the pseudo/combined south polar vertex stream by the primitive setup unit 222. The primitive flag of the last vertex among the three vertices (k=0~2) in sequence from the pseudo/combined south polar vertex stream is set to 1 and the last vertex together with its immediately-previous two vertices forms a triangle.

Step S603: Determine what type the south polar vertex stream is by the primitive setup unit 222. If the south polar vertex stream is a pseudo type, the flow goes to step S604. If the south polar vertex stream is a combined type, the "texture coordinates (u,v)" field in the complete data structure for each of the three vertices (k=0~2) in a complete south polar vertex stream in FIG. 6E is filled in with the image coordinates ($u_k$, $v_k$) in the partial data structure for each of the three vertices (k=0~2) in the combined south polar vertex stream and the flow goes to step S606.

Step S604: Calculate the image coordinates and the longitude and latitude of the three vertices according to the pseudo coordinates of the three vertices by the primitive setup unit 222. For each of the three vertices (k=0~2), calculate the image coordinates ($u_k$, $v_k$) in the pre-rotation equirectangular panoramic image 230 (texture space) using their pseudo coordinates ($i_k$, $j_k$) according to the following equations (2)~(3):

$$u_k = j_k * W/Nx; \qquad \text{/*equation (2)*/}$$

$$v_k = i_k * H/Ny, \qquad \text{/*equation (3)*/}$$

given (W, H)=(Wo, Ho)=(4096, 2048) and (Nx, Ny)=(144, 72). The "texture coordinates (u,v)" field in the complete data structure for each of the three vertices (k=0~2) in a complete south polar vertex stream in FIG. 6E is filled in with the image coordinates ($u_k$, $v_k$).

For each of the three vertices (k=0~2), calculate the longitude and latitude ($\theta_k$ and $\varphi_k$) in the pre-rotation equirectangular panoramic image 230 (texture space) using their pseudo coordinates ($i_k$, $j_k$) according to the following equations (4)~(5):

$$\theta_k = \theta_{start} + \theta_{step} * j_k; \qquad \text{/*equation (4)*/}$$

$$\varphi_k = \varphi_{start} + \varphi_{step} * i_k; \qquad \text{/*equation (5)*/}$$

given ($\theta_{start}$, $\varphi_{start}$)=(−180°,−90°) and ($\theta_{step}$ and $\varphi_{step}$)= (2.5°, 2.5°).

Step S606: Map the three vertices from the pre-rotation equirectangular panoramic image to the south polar image so as to obtain the image coordinates in the south polar image by the primitive setup unit 222. For each of the three vertices (k=0~2), calculate the image coordinates ($x_k$, $y_k$) in the south polar image (destination space) using the longitude and latitude ($\theta_k$ and $\varphi_k$) according to the following equations (6)~(8):

$$r = |\varphi_k - \varphi_{pole}|/\Omega; \qquad \text{/*equation (6)*/}$$

$$x_k = (W_p/2)*(1+r*\cos(\theta_k*\pi/180)); \qquad \text{/*equation (7)*/}$$

$$y_k = (W_p/2)*(1+r*\sin(\theta_k*\pi/180)); \qquad \text{/*equation (8)*/}$$

given $\Omega$=10°, $W_p$=256, $\varphi_{pole}$=+90° (corresponding to the south pole). Since the pre-rotation equirectangular panoramic image 230 is always treated as the texture space, the "texID" field in the complete data structure of each vertex in the complete south polar vertex stream is always set to 0.

Please note that the complete data structures of the three vertices (k=0~2) are finished in the complete south polar vertex stream after the "destination coordinates" field of each of the three vertices is filled in with the image coordinates ($x_k$, $y_k$) in FIG. 6E.

Step S608: Render a primitive/triangle in the south polar image 250 according to the complete data structures of the three vertices in the complete south polar vertex stream by the render engine 226. The primitive/triangle is formed by the three vertices (k=0~2). According to the complete data structures of the three vertices in the complete south polar vertex stream from the primitive setup unit 222, the render engine 226 performs triangle rasterization operations and texture mapping to render the primitive/triangle in the south polar image 250. Specifically, the render engine 226 performs triangle rasterization operations for a point Q having the image/destination coordinates ($x_Q$, $y_Q$) within the triangle formed by the three vertices (k=0~2) in the south polar image to generate the texture coordinates ($u_Q$, $v_Q$) of the point Q; afterward, the render engine 226 textures map the texture data from the pre-rotation equirectangular panoramic image using any appropriate method (such as nearest-neighbour interpolation, bilinear interpolation or trilinear interpolation) according to the texture coordinates of point Q and the three vertices to generate destination value of the point Q. In this manner, the render engine 226 sequentially generates destination value for each point/pixel until all the points within the triangle in the south polar image are processed/completed.

Step S610: Determine whether all the vertices within the pseudo/combined south polar vertex stream are processed by the primitive setup unit 222. If YES, the flow is terminated and the south polar image is rendered/produced; otherwise, return to the step S602 for the following three vertices in the pseudo/combined south polar vertex stream.

Analogous to the method of FIG. 6B and the south polar vertex streams in FIGS. 6C-6E, a north polar image 240 is produced by the image processing apparatus 220 at stage one of rotation phase based on the pre-rotation equirectangular panoramic image 230 and a combined/pseudo north polar vertex stream. Please note that the degrees of $\Omega$, $\theta_{step}$ and $\varphi_{step}$ are provided by way of example and not limitations of the invention. In the actual implementations, any other degrees can be used and this also falls in the scope of the invention.

Figure 7A:
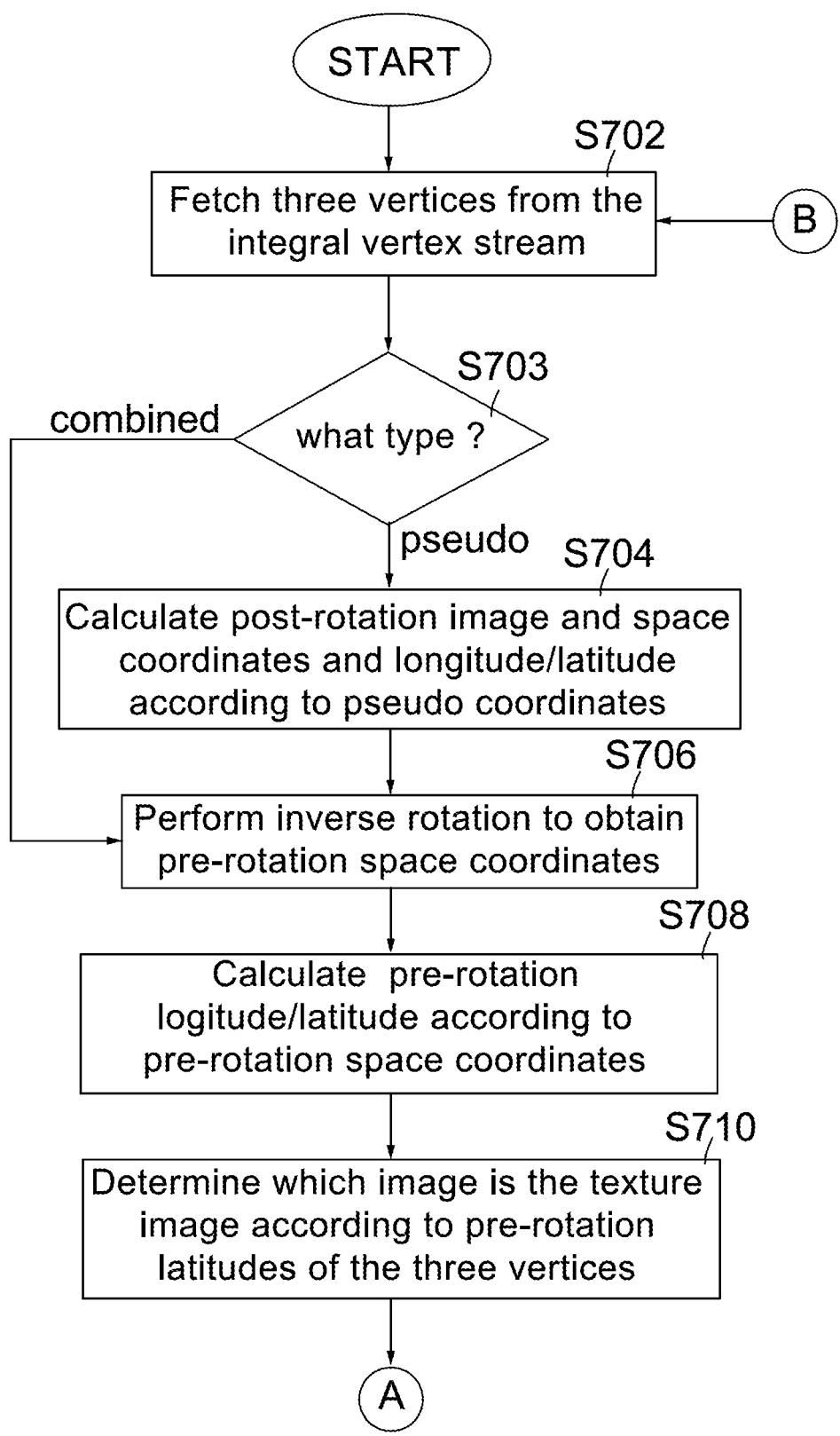
FIGS. 7A-7B show a flow chart of a transform method applied in a primitive setup unit of a panoramic image processing system with a rotated image capture module and at stage 2 of rotation phase according to one embodiment of the invention.
Figure 7B:
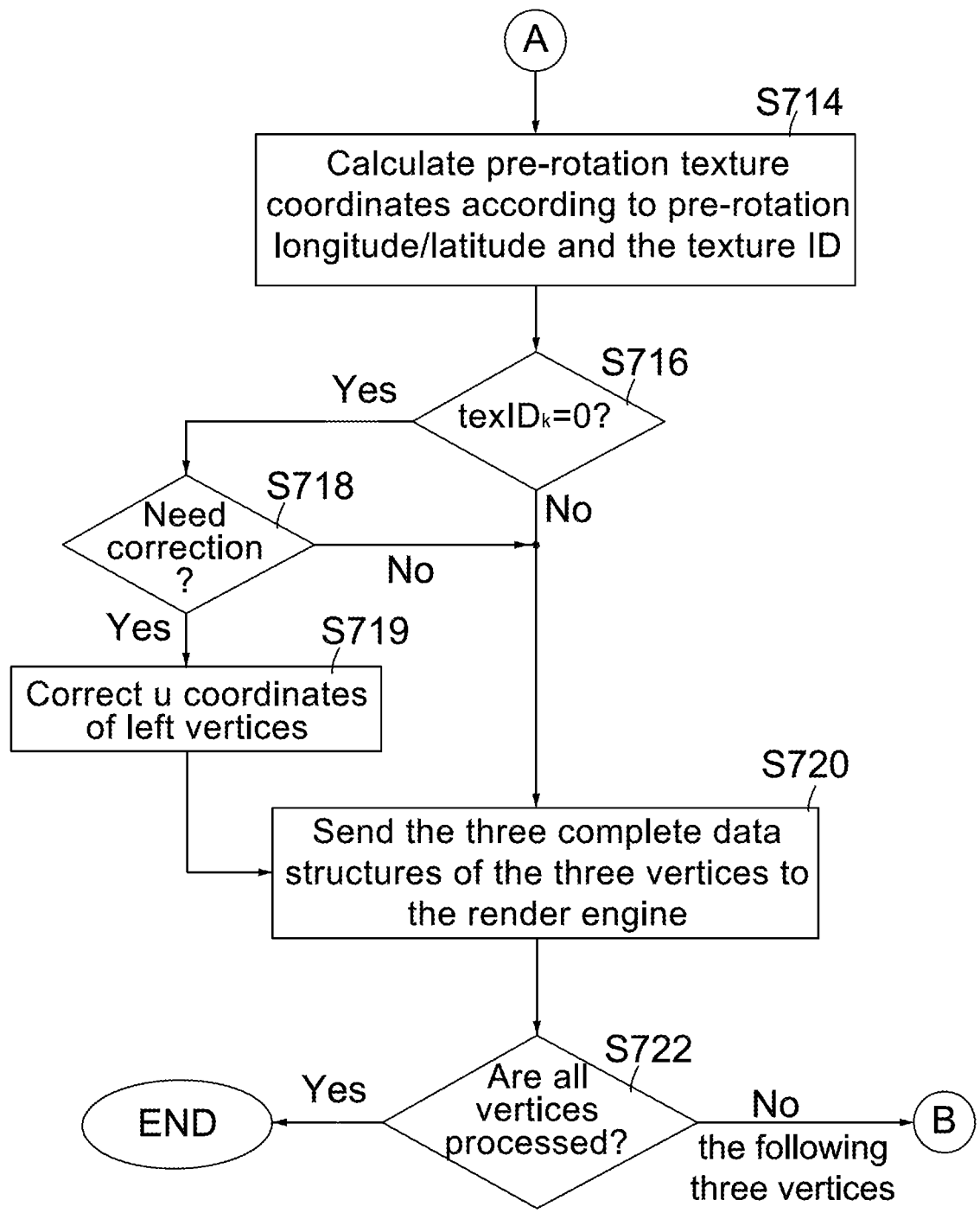

FIGS. 7A-7B show a flow chart of a transform method applied in a primitive setup unit 222 of a panoramic image processing system 220 with a rotated image capture module and at stage two of rotation phase according to one embodiment of the invention. Hereinafter, the transform method of the invention is described based on the pseudo/combined integral vertex stream with reference to FIGS. 2C, 3B and 7A-7B and with the assumption that the image processing apparatus 220 enters stage two of the rotation phase, already receives the inverse rotation matrix $R_{3D}^{-1}$ and already forms the pre-rotation equirectangular panoramic image 230, the north polar image 240 and the south polar image 250 at stage one of the rotation phase.

Step S702: Sequentially fetch three vertices from the pseudo/combined integral vertex stream.

Step S703: Determine what type the integral vertex stream is. If the integral vertex stream is a pseudo type, the flow goes to step S704. If the integral vertex stream is a combined type, the "post-rotation destination coordinates" field of the complete data structure of each of the three vertices (for k=0~2) in the complete integral vertex stream in FIG. 3D is filled in with the post-rotation image coordinates $(x_k, y_k)$ of the partial data structure of each of the three vertices (for k=0~2) in the combined integral vertex stream in FIG. 3C, and the flow goes to step S706.

Step S704: Calculate post-rotation space coordinates, post-rotation image coordinates and post-rotation longitude/latitude of the three vertices according to their pseudo coordinates. For each of the three vertices (k=0~2), calculate the post-rotation image coordinates $(x_k, y_k)$ in the post-rotation equirectangular panoramic image 280 using their pseudo coordinates $(i_k, j_k)$ according to the following equations (2)~(3):

$$x_k = j_k * W/Nx, \quad \text{/*equation (2)*/}$$

$$y_k = i_k * H/Ny; \quad \text{/*equation (3)*/}$$

given (W, H)=(Wr, Hr)=(4096, 2048) and (Nx, Ny)=(144, 72). In the complete integral vertex stream in FIG. 3D, the "post-rotation destination coordinates" field of the complete data structure of each of the three vertices is filled in with the above post-rotation image coordinates $(x_k, y_k)$, for k=0~2.

For each of the three vertices (k=0~2), calculate the post-rotation longitude and latitude ($\theta_k$ and $\varphi_k$) in the post-rotation equirectangular panoramic image 280 using their pseudo coordinates $(i_k, j_k)$ according to the following equations (4)~(5):

$$\theta_k = \theta_{start} + \theta_{step} * j_k; \quad \text{/*equation (4)*/}$$

$$\varphi_k = \varphi_{start} + \varphi_{step} * i_k; \quad \text{/*equation (5)*/}$$

given $(\theta_{start}, \varphi_{start})=(-180°, -90°)$ and $(\theta_{step}$ and $\varphi_{step})= (2.5°, 2.5°)$.

For each of the three vertices (k=0~2), calculate the post-rotation space coordinates $(X_k, Y_k$ and $Z_k)$ using its post-rotation longitude and latitude ($\theta_k$ and $\varphi_k$) according to the following equations (9)~(11):

$$X_k = \cos(\varphi_k * \pi/180) * \cos(\theta_k * \pi/180); \quad \text{/*equation (9)*/}$$

$$Y_k = \cos(\varphi_k * \pi/180) * \sin(\theta_k * \pi/180); \quad \text{/*equation (10)*/}$$

$$Z_k = \sin(\varphi_k * \pi/180). \quad \text{/*equation (11)*/}$$

Step S706: Perform inverse rotation operations over the post-rotation space coordinates of each of the three vertices (k=0~2) to obtain pre-rotation space coordinates according to the inverse rotation matrix $R_{3D}^{-1}$. The primitive setup unit 222 performs inverse rotation operations over the post-rotation space coordinates $(X_k, Y_k$ and $Z_k)$ of each of the three vertices (k=0~2) to obtain its pre-rotation space coordinates $(X'_k, Y'_k$ and $Z'_k)$ according to the inverse rotation matrix $R_{3D}^{-1}$ (having the following nine elements $R_{11}$~$R_{33}$) and the following equations (12)~(14):

$$X'_k = R_{11} * X_k + R_{12} * Y_k + R_{13} * Z_k; \quad \text{/*equation (12)*/}$$

$$Y'_k = R_{21} * X_k + R_{22} * Y_k + R_{23} * Z_k; \quad \text{/*equation (13)*/}$$

$$Z'_k = R_{31} * X_k + R_{32} * Y_k + R_{33} * Z_k. \quad \text{/*equation (14)*/}$$

Step S708: Calculate the pre-rotation longitude and latitude of each of the three vertices according to their pre-rotation space coordinates. In one embodiment, the following program codes are provided in the primitive setup unit 222 to obtain the pre-rotation longitude and latitude of each of the three vertices.

r'=sqrt($X'_k * X'_k + Y'_k * Y'_k$);
if (r'==0) {
 $\varphi'_k$=($Z'_k$<0) ?-90: 90;
 $\theta'_k$=0;
}
else {
 x1=fabs($X'_k$); /*x1=the absolute value of $X'_k$*/
 y1=fabs($Y'_k$); /*Y1=the absolute value of $Y'_k$*/
 z1=fabs($Z'_k$); /*z1=the absolute value of $Z'_k$*/
 $\varphi'_k$=atan 2(r, z1)*180/PI; /* $\varphi'_k$=arctan$^{-1}$(r/z1)*180/$\pi$*/
 if ($Z'_k$<0) $\varphi'_k$=-$\varphi'_k$,
   $\theta'_k$=atan 2(x1,y1)*180/PI; /* $\theta'_k$=arctan$^{-1}$(x1/y1)*180/$\pi$*/
 if ($X'_k$>=0 && $Y'_k$>=0) $\theta'_k$=$\theta'_k$;
 else if ($X'_k$<0 && $Y'_k$>=0) $\theta'_k$=180-$\theta'_k$;
 else if ($X'_k$<0 && $Y'_k$<0) $\theta'_k$=180+$\theta'_k$;
 else $\theta'_k$=360-$\theta'_k$;
}

Finally, we obtain the pre-rotation longitude and latitude ($\theta'_k, \varphi'_k$) of each of the three vertices (k=0~2).

Step S710: Determine which image is the texture image according to the pre-rotation latitudes of the three vertices and the latitudes of the north pole (Zenith) and the south pole (Nadir). Given $\varphi_{north}$=-90° and $\varphi_{south}$=90°, the primitive setup unit 222 calculates the following three first latitude differences: ($\varphi'_0 - \varphi_{north}$), ($\varphi'_1 - \varphi_{north}$) and ($\varphi'_2 - \varphi_{north}$)) and the following three second latitude differences: ($\varphi'_0 - \varphi_{south}$), ($\varphi'_1 - \varphi_{south}$) and ($\varphi'_2 - \varphi_{south}$). If all of the above three first latitude differences (($\varphi'_k - \varphi_{north}$)) are less than a threshold TH, it is determined that the north polar image 240 is designated as the texture image and texID$_k$=1 if all of the above three second latitude differences are less than a threshold TH, it is determined that the south polar image 250 is designated as the texture image and texID$_k$=2; otherwise, it is determined that the pre-rotation equirectangular panoramic image 230 is designated as the texture image and texID$_k$=0. In the complete integral vertex stream, fill in the "texID" field of the complete data structure of each of the three vertices with the texID$_k$ value, for k=0~2.

Step S714: Calculate the pre-rotation texture coordinates $(u_k, v_k)$ of the three vertices (k=0~2) according to their pre-rotation longitude and latitude ($\theta'_k, \varphi'_k$) and the texture IDs (texID$_k$). In one embodiment, the following program codes are provided in the primitive setup unit 222 to obtain the pre-rotation texture coordinates.

for (k=0; k<3; k++){
 If (texID$_k$==0) {/*pre-rotation equirectangular panoramic image is designated as the texture image */
 s=($\theta'_k - \theta_{start}$)/360,
 if (s<0) s=s+1;
 if (s>=1) s=s-1,
 t=($\varphi'_k - \varphi_{start}$)/180;
 $u_k$=s*Wr;
 $v_k$=t* Hr;
 }
 else{/* north/south polar image is designated as the texture image */
 if (texID$_k$==1) $\varphi_{pole}$=$\varphi_{north}$;
 else $\varphi_{pole}$=$\varphi_{south}$;
 r=|$\varphi'_k - \varphi_{pole}$|/$\Omega$;
 $u_k$=($W_p$/2)*(1+r*cos($\theta'_k * \pi/180$));
 $v_k$=($W_p$/2)*(1+r*sin($\theta'_k * \pi/180$));
 }
}

At the end of this step, the pre-rotation texture coordinates $(u_k, v_k)$ of the three vertices (k=0~2) are determined if any of the north and the south polar images is designated as the texture image (texID$_k$ equal to 1 or 2). In the complete integral vertex stream as shown in FIG. 3D, the "pre-rotation texture coordinates" field of the complete data structure of each of the three vertices is filled in with the above texture coordinates($u_k$, $v_k$), for k=0~2, for any of the north and the south polar images is designated as the texture image (texID$_k$ equal to 1 or 2).

Step S716: Determine whether texID$_k$ is equal to 0. Stated in another way, determine whether the pre-rotation equirectangular panoramic image is designated as the texture image. If YES, the flow goes to step S718; otherwise, the flow goes to step S720.

Figure 8:
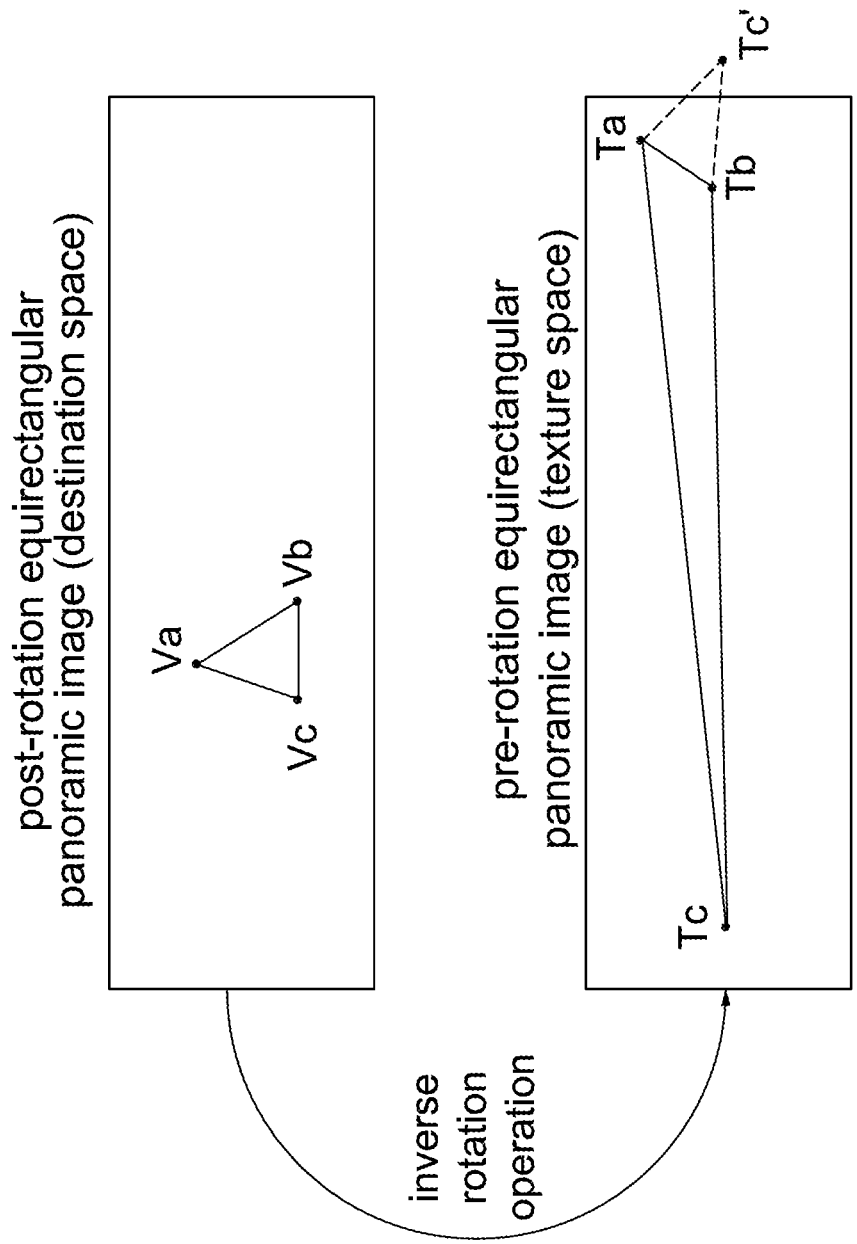
FIG. 8 is an example diagram showing a post-rotation triangle VaVbVc in a post-rotation equirectangular panoramic image and a pre-rotation triangle TaTbTc in a pre-rotation equirectangular panoramic image.

Step S718: Determine whether the pre-rotation three vertices need correction. If YES, the flow goes to step S719; otherwise, the flow goes to step S720. FIG. 8 is an example diagram showing a post-rotation triangle VaVbVc in a post-rotation equirectangular panoramic image 280 and a pre-rotation triangle TaTbTc in a pre-rotation equirectangular panoramic image 230. Referring to FIG. 8, the post-rotation triangle VaVbVc is located in the middle of the post-rotation equirectangular panoramic image 280. After the primitive setup unit 222 performs inverse rotation operations over the three vertices VaVbVc, vertices of the corresponding pre-rotation triangle TaTbTc becomes located near both right edge and left edge of the pre-rotation equirectangular panoramic image 230. However, the two edges of the pre-rotation triangle TaTbTc almost stretch across the entire image, which is not reasonable. Thus, the primitive setup unit 222 needs to firstly determine whether the three pre-rotation vertices TaTbTc need any correction, i.e., determining whether a vertex for the triangle TaTbTc is located more than a threshold distance (e.g., Wo/2) from the other two vertices in the pre-rotation equirectangular panoramic image 230. For the example in FIG. 8, the left vertex Tc on the left side is located more than a threshold distance (e.g., Wo/2) from the other right vertices on the right side, and thus it is determined that the pre-rotation triangle TaTbTc needs to be corrected. On the other hand, if the left vertex Tc on the left side is located less than a threshold distance (e.g., Wo/2) from the other right vertices on the right side, and thus it is determined that there is no need for the pre-rotation triangle TaTbTc to be corrected.

Step S719: Correct u coordinates of the left vertex/vertices among the three pre-rotation vertices TaTbTc on the left side of the pre-rotation equirectangular panoramic image. If the three pre-rotation vertices TaTbTc need correction, u coordinates of all the left vertex/vertices among the three pre-rotation vertices TaTbTc on the left side of the pre-rotation equirectangular panoramic image would be corrected (or wrapped around) along the u-axis by the primitive setup unit 222 so that the left vertex/vertices would be re-located and gets nearer to the right vertices. Specifically, the primitive setup unit 222 corrects the u coordinates of the left vertex/vertices on the left side by respectively adding the u coordinates of the left vertex/vertices and Wo to obtain new u coordinates. For the example in FIG. 8, the primitive setup unit 222 corrects the u coordinate (e.g., u1) of the left vertex Tc by adding the u coordinate of the left vertex Tc and Wo to obtain a new u coordinate (e.g., u2=u1+Wo). After correction, the left vertex Tc is moved to the vertex Tc' on the right side. Please note that although u2 is greater than Wo, before rendering images, the render engine 226 automatically interprets u2 as u2' by performing the following modulo operation: u2'=(u2 mod Wo). In one embodiment, the following program codes are provided in the primitive setup unit 222 to wrap around u coordinates of the left vertex/vertices along the u-axis.

```
for (k=0; k<3; k++) {
    if (u_k<W_O/2) flag[k]=0; /* vertex located on the left side*/
    else flag[k]=1; /* vertex located on the right side*/
    if (k==0) {
        u_min=u_max=u_k;
    }
    else {
        if (u_k<u_min) u_min=u_k; /* find a minimum*/
        if(u_k>u_max) u_max=u_k; /* find a maximum*/
    }
}
if ((u_max-u_min)>=W_O/2) {/* find two vertices located on opposite sides */
    for (k=0; k<3; k++) {
        if (flag[k]=0) {
            u'_k=u_k+W_O; /* add W_O with u coordinate of each left vertex */
        }
    }
}
else {/* normal case; no need to correct u coordinate */
    for (k=0; k<3; k++) {
        u'_k=u_k;
    }
}
```

Finally, we obtain the pre-rotation texture coordinates ($u'_k$, $v'_k$) of the three vertices (k=0~2) for the pre-rotation equirectangular panoramic image 230 assigned as the texture image. In the complete integral vertex stream as shown in FIG. 3D, the "pre-rotation texture coordinates" field of the complete data structure of each of the three vertices (k=0~2) is filled in with the pre-rotation texture coordinates($u'_k$, $v'_k$) for the pre-rotation equirectangular panoramic image 230 assigned as the texture image.

Step S720: Send the complete data structures of the three vertices to the render engine 226. The primitive/triangle is formed by the three vertices (k=0~2). The primitive setup unit 222 sends the three complete data structures of the three vertices (k=0~2) in the complete integral vertex stream to the render engine 226. According to the complete data structures of the three vertices in the complete integral vertex stream from the primitive setup unit 222, the render engine 226 performs triangle rasterization operations and texture mapping to render the primitive/triangle in the post-rotation equirectangular panoramic image 280. Specifically, the render engine 226 performs triangle rasterization operations for a point Q having the image coordinates ($x_Q$, $y_Q$) within the triangle formed by the three vertices (k=0~2) in the post-rotation equirectangular panoramic image to generate the texture coordinates ($u_Q$, $v_Q$) of the point Q; afterward, the render engine 226 textures map the texture data from the texture space (one of the pre-rotation equirectangular panoramic image 230, the north polar image 240 and the south polar image 250) specified by texID$_k$ using any appropriate method (such as nearest-neighbour interpolation, bilinear interpolation or trilinear interpolation) according to the texture coordinates of point Q and the three vertices (k=0~2) to generate destination value of the point Q. In this manner, the render engine 226 sequentially generates destination value for each point/pixel until all the points within the triangle in the post-rotation equirectangular panoramic image 280 are processed/completed.

Step S722: Determine whether all the vertices within the pseudo/combined integral vertex stream are processed by the primitive setup unit 222. If YES, the flow is terminated and the post-rotation equirectangular panoramic image 280 is produced; otherwise, return to the step S702 for the following three vertices in the pseudo/combined integral vertex stream.

In one embodiment, the processing unit 205 and the primitive setup unit 222 are implemented with a general-purpose processor having a first program memory (not shown); the render engine 226 is implemented with a second program memory and a graphics processing unit (GPU) (not shown). The first program memory stores a first processor-executable program and the second program memory stores a second processor-executable program. When the first processor-executable program is executed by the general-purpose processor, the general-purpose processor is configured to function as: the processing unit 205 and the primitive setup unit 222. When the second processor-executable program is executed by the GPU, the GPU is configured to function as: the render engine 226 that performs rasterization, texture mapping and blending operations to form a pre-rotation equirectangular panoramic image 230, a post-rotation equirectangular panoramic image 280, a south polar image 250 and a north polar image 240.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A transform method applied in an image processing system having an image capture module and a render engine, the image capture module capturing a view with a 360-degree horizontal field of view and 180-degree vertical field of view to generate a plurality of camera images, the method comprising:
   when the image capture module is rotated, respectively performing inverse rotation operations over post-rotation space coordinates of three first vertices from an integral vertex stream according to rotation angles of the image capture module to obtain pre-rotation space coordinates of the three first vertices;
   calculating pre-rotation longitudes and latitudes of the three first vertices according to the pre-rotation space coordinates of the three first vertices;
   selecting one from a pre-rotation panoramic image, a south polar image and a north polar image as a texture image to determine a texture ID for the three first vertices according to the pre-rotation latitudes of the three first vertices; and
   calculating pre-rotation texture coordinates according to the texture ID and the pre-rotation longitude and latitude to form a first complete data structure for each of the three first vertices;
wherein the three first complete data structures of the three first vertices are inputted to the render engine and cause the render engine to render a triangle in a post-rotation panoramic image.

2. The method according to claim 1, further comprising:
   repeating all the steps until all the first vertices from the integral vertex stream are processed so that the post-rotation panoramic image is completed by the render engine.

3. The method according to claim 1, wherein the first complete data structure for each of the first vertices comprises the pre-rotation texture coordinates, the texture ID and post-rotation destination coordinates.

4. The method according to claim 3, wherein the integral vertex stream comprises a plurality of groups of three first vertices and each first vertex comprises attached coordinates, and wherein each group of three first vertices form a triangle in a first triangle mesh modeling the post-rotation panoramic image.

5. The method according to claim 4, wherein the attached coordinates of the three first vertices from the first vertex stream are respectively specified by the post-rotation space coordinates and the post-rotation image coordinates of the three first vertices in the post-rotation panoramic image.

6. The method according to claim 4, further comprising:
   when the image capture module is rotated, calculating post-rotation image coordinates and the post-rotation space coordinates of the three first vertices according to first pseudo coordinates of the three first vertices prior to the step of respectively performing inverse rotation operations;
wherein the attached coordinates of the three first vertices are specified by the first pseudo coordinates of the three first vertices.

7. The method according to claim 6, wherein the first pseudo coordinates refer to a first pseudo coordinate system used in the first triangle mesh modeling the post-rotation panoramic image and are measured in units of horizontal spacing between first vertices along a horizontal axis and in units of vertical spacing between first vertices along a vertical axis in the first pseudo coordinate system.

8. The method according to claim 6, wherein the step of calculating the post-rotation image coordinates and the post-rotation space coordinates further comprises:
   calculating the post-rotation image coordinates according to the first pseudo coordinates for each of the three first vertices;
   calculating the post-rotation longitude and latitude according to the first pseudo coordinates for each of the three first vertices; and
   calculating the post-rotation space coordinates according to the post-rotation longitude and latitude for each of the three first vertices;
   wherein the post-rotation image coordinates for each of the first vertices are assigned to the post-rotation destination coordinates in the corresponding first complete data structure.

9. The method according to claim 1, further comprising:
   before the image capture module is rotated, generating the pre-rotation panoramic image according to the camera images.

10. The method according to claim 1, further comprising:
   when the image capture module is rotated, prior to the step of respectively performing the inverse rotation operations,
generating a north polar image according to a north polar vertex stream and the pre-rotation panoramic image and generating a south polar image according to a south polar vertex stream and the pre-rotation panoramic image.

11. The method according to claim 10, wherein the north vertex stream comprises a plurality of groups of three second vertices and each second vertex comprises second texture coordinates, wherein each group of three second vertices form a triangle in a second triangle mesh modeling a north portion of the pre-rotation panoramic image, wherein the south vertex stream comprises a plurality of groups of three third vertices and each third vertex comprises third texture coordinates, and wherein each group of three third vertices form a triangle in a third triangle mesh modeling a south portion of the pre-rotation panoramic image.

12. The method according to claim 11, wherein the north portion of the pre-rotation panoramic image ranges have negative latitudes that range from −90° to a first degree, and the south portion of the pre-rotation panoramic image ranges have positive latitudes that range from +90° to a second degree.

13. The method according to claim 11, wherein the step of generating the north polar image comprises:
   (n1) for a group of three second vertices from the north polar vertex stream, calculating polar destination coordinates in the north polar image according to a longitude and a latitude in the pre-rotation panoramic image to form a second complete data structure with respect to each of the three vertices;
   (n2) performing triangle rasterization operations and texture mapping based on the three second complete data structures of the three second vertices by the render engine to render a triangle in the north polar image; and
   (n3) repeating the steps of (n1) and (n2) until all the second vertices from the second vertex stream are processed to form the north polar image.

14. The method according to claim 13, wherein the step of (n1) further comprises:
   for each of the three second vertices, calculating its polar destination coordinates (x, y) in the north polar image according to its longitude and latitude ($\theta,\varphi$) in the pre-rotation panoramic image and three equations to form the second complete data structure comprising the polar destination coordinates (x, y) in the north polar image and initial texture coordinates in the pre-rotation panoramic image;
wherein the three equations are given by:

$$r=|\varphi-\varphi_{pole}|/\Omega;$$

$$x=(W_p/2)*(1+r*\cos(\theta*\pi/180)); \text{ and}$$

$$y=(W_p/2)*(1+r*\sin(\theta*\pi/180));$$

wherein $\varphi_{pole}$ denotes a latitude of −90° and $W_p$ denotes a side length of the north polar image; and
wherein $\Omega$ denotes a latitude difference between −90° and the first degree.

15. The method according to claim 14, wherein the second texture coordinates of the three second vertices from the north polar vertex stream are specified by the longitudes and latitudes and the initial texture coordinates in the pre-rotation panoramic image.

16. The method according to claim 13, wherein the step of generating the north polar image further comprises:
   (n01) calculating the initial texture coordinates in the pre-rotation panoramic image according to second pseudo coordinates for each of the three second vertices prior to the steps (n1)~(n3); and
   (n02) calculating the longitude and the latitude in the pre-rotation panoramic image according to the second pseudo coordinates for each of the three second vertices;
   wherein the second texture coordinates of the three second vertices from the north polar vertex stream are specified by the second pseudo coordinates in the pre-rotation panoramic image;
   wherein the second pseudo coordinates refer to a second pseudo coordinate system used in the second triangle mesh modeling the pre-rotation panoramic image and are measured in units of horizontal spacing between second vertices along a horizontal axis and in units of vertical spacing between second vertices along a vertical axis in the second pseudo coordinate system.

17. The method according to claim 11, wherein the step of generating the south polar image comprises:
   (s1) for a group of three third vertices from the south polar vertex stream, calculating polar destination coordinates in the south polar image according to a longitude and a latitude in the pre-rotation panoramic image to form a third complete data structure with respect to each of the three third vertices;
   (s2) performing triangle rasterization operations and texture mapping based on the three third complete data structures of the three third vertices by the render engine to render a triangle in the south polar image; and
   (s3) repeating the steps of (s1) and (s2) until all the third vertices from the third vertex stream are processed to form the south polar image.

18. The method according to claim 17, wherein the step of (s1) further comprises:
   for each of the three third vertices, calculating its polar destination coordinates (x, y) in the south polar image according to its longitude and latitude ($\theta,\varphi$) in the pre-rotation panoramic image to form a third complete data structure comprising the polar destination coordinates (x, y) in the south polar image and initial texture coordinates in the pre-rotation panoramic image;
wherein the three equations are given by:

$$r=|\varphi-\varphi_{pole}|/\Omega;$$

$$x=(W_p/2)*(1+r*\cos(\theta*\pi/180));$$

$$y=(W_p/2)*(1+r*\sin(\theta*\pi/180));$$

wherein $\varphi_{pole}$ denotes a latitude of +90° and $W_p$ denotes a side length of the south polar image;
wherein $\Omega$ denotes a latitude difference between +90° and the second degree.

19. The method according to claim 18, wherein the third texture coordinates of the three third vertices from the south polar vertex stream are specified by the longitudes and latitudes and the initial texture coordinates in the pre-rotation panoramic image.

20. The method according to claim 17, wherein the step of generating the south polar image further comprises:
   (s01) calculating the initial texture coordinates in the pre-rotation panoramic image according to third pseudo coordinates for each of the three third vertices prior to the steps (s1)~(s3); and
   (s02) calculating the longitude and the latitude in the pre-rotation panoramic image according to the third pseudo coordinates for each of the three third vertices;
   wherein the third pseudo coordinates in the pre-rotation panoramic image are assigned to the third texture coordinates of the three third vertices from the south polar vertex stream;
   wherein the third pseudo coordinates refer to a third pseudo coordinate system used in the third triangle mesh modeling the pre-rotation panoramic image and are measured in units of horizontal spacing between third vertices along a horizontal axis and in units of vertical spacing between third vertices along a vertical axis in the third pseudo coordinate system.

21. The method according to claim 1, wherein the step of calculating the pre-rotation texture coordinates further comprises:
   if the texture ID denotes one of the north and the south polar images, calculating the pre-rotation texture coordinates (u,v) for each of the three first vertices according to its pre-rotation longitude and latitude ($\theta'$, $\varphi'$), the texture ID and the following three equations:

$r = |\varphi - \varphi_{pole}|/\Omega;$ $u = (W_p/2)*(1 + r*\cos(\theta'*\pi/180));$ and $v = (W_p/2)*(1 + r*\sin(\theta'*\pi/180));$ wherein $W_p$ denotes a side length of the north and the south polar images; and wherein if the texture ID denotes the north polar image, $\varphi_{pole}$ denotes a latitude of −90°, otherwise, $\varphi_{pole}$ denotes a latitude of −90°.

22. The method according to claim 1, wherein the step of calculating the pre-rotation texture coordinates further comprises:

if the texture ID denotes the pre-rotation panoramic image, calculating the pre-rotation texture coordinates (u,v) for each of the three first vertices according to its pre-rotation longitude and latitude ($\theta'_k$, $\varphi'_k$) and the following equations:

$s = (\theta'_k - \theta_{start})/360;$ $s = \begin{cases} s+1, & \text{if } s < 0 \\ s-1, & \text{if } s \geq 1 \end{cases}$ $t = (\varphi'_k - \varphi_{start})/180;$ -continued $u = s * Wo;$ and $v = t * Ho;$ wherein $\theta_{start}$ and $\theta_{start}$ respectively denote the longitude and latitude of the topmost and leftmost vertex in the pre-rotation panoramic image; and wherein Wo and Ho respectively denote a width and a height of the pre-rotation panoramic image.

23. The method according to claim 22, wherein the step of calculating the pre-rotation texture coordinates further comprises:

if the texture ID denotes the pre-rotation panoramic image, measuring a distance along u-axis between the leftmost vertex and the rightmost vertex among the three first vertices in the pre-rotation panoramic image;

if the distance along u-axis is greater than a threshold, adding Wo and a u coordinate of each left vertex among the three first vertices to obtain its modified u coordinate, wherein each left vertex is located on the left side of the pre-rotation panoramic image; and if the distance along u-axis is greater than the threshold, forming the first complete data structure for each left vertex according to its modified u coordinate and forming the first complete data structure for each of the other vertices among the three vertices according to the pre-rotation texture coordinates (u,v).

\* \* \* \* \*